US010075864B2

(12) United States Patent
Xiong et al.

(10) Patent No.: US 10,075,864 B2
(45) Date of Patent: Sep. 11, 2018

(54) SYSTEM AND METHOD FOR MEASUREMENT REPORTING IN AN UNLICENSED SPECTRUM

(71) Applicant: Intel IP Corporation, Santa Clara, CA (US)

(72) Inventors: Gang Xiong, Beaverton, OR (US); Hong He, Beijing (CN); Hwan-Joon Kwon, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/693,653

(22) Filed: Apr. 22, 2015

(65) Prior Publication Data

US 2016/0007350 A1    Jan. 7, 2016

Related U.S. Application Data

(60) Provisional application No. 62/020,316, filed on Jul. 2, 2014, provisional application No. 62/072,861, filed on Oct. 30, 2014.

(51) Int. Cl.
*H04J 3/16*    (2006.01)
*H04W 24/10*    (2009.01)
(Continued)

(52) U.S. Cl.
CPC ............. *H04W 24/10* (2013.01); *H04L 5/001* (2013.01); *H04W 8/22* (2013.01); *H04W 16/14* (2013.01); *H04W 28/22* (2013.01); *H04W 72/00* (2013.01)

(58) Field of Classification Search
CPC ..... H04W 24/10; H04W 28/18; H04W 28/20; H04W 28/22; H04W 72/00; H04W 72/02;
(Continued)

(56) References Cited

U.S. PATENT DOCUMENTS 9,408,103 B2 * 8/2016 Bai ........................ H04W 24/10
2011/0092214 A1 * 4/2011 Iwamura ............... H04W 36/30
455/438

(Continued)

FOREIGN PATENT DOCUMENTS

JP    2012-147216    8/2012
KR    20170013316 A    2/2017
(Continued)

OTHER PUBLICATIONS

Notification of transmittal of the International Search Report and the Written Opinion of the International Searching Authority, or the Declaration PCT/ISA/220 dated Sep. 22, 2015 from International Application No. PCT/US2015/034958, 13 pages.
(Continued)

*Primary Examiner* — Kevin Mew
(74) *Attorney, Agent, or Firm* — Schwabe, Williamson & Wyatt, P.C.

(57) ABSTRACT

A UE may signal, to an eNB, a capability of the UE to communicate in an unlicensed band. The UE may communicate one or more measurements to the eNB associated with the unlicensed band. Based on the one or more measurements, the eNB may activate and configure communication with the UE through the unlicensed band.

25 Claims, 11 Drawing Sheets

(51) Int. Cl.
  *H04W 28/22* (2009.01)
  *H04W 72/00* (2009.01)
  *H04L 5/00* (2006.01)
  *H04W 8/22* (2009.01)
  *H04W 16/14* (2009.01)

(58) Field of Classification Search
  CPC . H04W 72/04; H04W 72/0406; H04W 72/08; H04W 72/082; H04W 72/085; H04W 72/087
  See application file for complete search history.

(56) References Cited

U.S. PATENT DOCUMENTS

| | | | |
|---|---|---|---|
| 2011/0281601 A1* | 11/2011 | Ahn | H04W 8/24 455/500 |
| 2012/0113844 A1* | 5/2012 | Krishnamurthy | H04L 1/0026 370/252 |
| 2012/0129522 A1 | 5/2012 | Kim et al. | |
| 2013/0016649 A1* | 1/2013 | Damnjanovic | H04W 88/04 370/315 |
| 2013/0121272 A1* | 5/2013 | Barbieri | H04W 72/08 370/329 |
| 2013/0143502 A1 | 6/2013 | Kazmi et al. | |
| 2013/0155991 A1* | 6/2013 | Kazmi | H04W 72/0453 370/329 |
| 2013/0165134 A1* | 6/2013 | Touag | H04W 72/0486 455/452.1 |
| 2013/0176891 A1* | 7/2013 | Lee | H04W 24/10 370/252 |
| 2013/0178225 A1* | 7/2013 | Xing | H04W 16/14 455/454 |
| 2013/0183970 A1* | 7/2013 | Chen | H04W 36/30 455/436 |
| 2013/0188552 A1* | 7/2013 | Kazmi | H04L 5/001 370/315 |
| 2013/0195045 A1* | 8/2013 | Papasakellariou | H04W 72/042 370/329 |
| 2013/0195073 A1 | 8/2013 | Chen et al. | |
| 2013/0208601 A1* | 8/2013 | Cui | H04W 24/10 370/252 |
| 2013/0235756 A1* | 9/2013 | Seo | H04L 1/0026 370/252 |
| 2013/0336156 A1* | 12/2013 | Wei | H04L 5/001 370/252 |
| 2014/0023022 A1 | 1/2014 | Cheng et al. | |
| 2014/0031054 A1* | 1/2014 | Zou | H04W 16/14 455/452.2 |
| 2014/0036818 A1 | 2/2014 | Koskela et al. | |
| 2014/0043979 A1* | 2/2014 | Etemad | H04B 7/2656 370/237 |
| 2014/0044000 A1 | 2/2014 | Charbit et al. | |
| 2014/0044056 A1 | 2/2014 | Chen et al. | |
| 2014/0044105 A1* | 2/2014 | Bontu | H04L 5/001 370/336 |
| 2014/0098761 A1 | 4/2014 | Lee et al. | |
| 2014/0220970 A1 | 8/2014 | Yang et al. | |
| 2014/0301360 A1* | 10/2014 | Bontu | H04W 36/0083 370/331 |
| 2015/0063148 A1* | 3/2015 | Sadek | H04L 1/20 370/252 |
| 2015/0126207 A1* | 5/2015 | Li | H04W 16/14 455/452.1 |
| 2015/0163801 A1* | 6/2015 | Sadek | H04W 72/0446 370/336 |
| 2015/0215471 A1* | 7/2015 | Ljung | H04M 15/58 455/405 |
| 2015/0304872 A1* | 10/2015 | Sadek | H04W 24/10 370/252 |
| 2015/0312850 A1* | 10/2015 | Li | H04W 24/10 370/329 |
| 2016/0037514 A1 | 2/2016 | Xiong et al. | |
| 2016/0066204 A1* | 3/2016 | Khawer | H04W 72/085 455/500 |
| 2016/0095076 A1 | 3/2016 | Xiong et al. | |
| 2016/0128055 A1 | 5/2016 | Xiong et al. | |
| 2016/0134403 A1 | 5/2016 | Xiong et al. | |
| 2016/0249224 A1* | 8/2016 | Prasad | H04W 16/14 |
| 2017/0295576 A1* | 10/2017 | Fukuta | H04W 72/0453 |

FOREIGN PATENT DOCUMENTS

| | | |
|---|---|---|
| WO | 2013049768 A1 | 4/2013 |
| WO | 2013/143053 A1 | 10/2013 |
| WO | 2013/161135 A1 | 10/2013 |
| WO | 2013149390 A1 | 10/2013 |
| WO | 2013174263 A1 | 11/2013 |
| WO | 2014109684 A1 | 7/2014 |
| WO | 2014113095 A1 | 7/2014 |
| WO | 2016018526 A1 | 2/2016 |
| WO | 2016048519 A1 | 3/2016 |

OTHER PUBLICATIONS

3GPP, "Evolved Universal Terrestrial Radio Access (E-UTRA); Radio Resource Control (RRC); Protocol specification (Release 12)," 3GPP TS 36.331 V12.1.0 (Mar. 2014), Mar. 19, 2014, 356 pages.

3GPP, "Evolved Universal Terrestrial Radio Access (E-UTRA); Physical channels and modulation (Release 12)," 3GPP TS 36.211 V12.1.0 (Mar. 2014), Mar. 21, 2014, 120 pages.

3GPP, "Evolved Universal Terrestrial Radio Access (E-UTRA); Multiplexing and channel coding (Release 12)," 3GPP TS 36.212 V12.0.0 (Dec. 2013), Dec. 20, 2013, 88 pages.

Office Action dated Aug. 17, 2017 from Korean Application No. 2016-7033401, 9 pages.

3GPP TR 36.888 V2.1.1 (Jun. 2013); "Technical Specification Group Radio Access Network; Study on provision of low-cost MTC UEs based on LTE; (Release 12)," 55 pages.

3GPP TS 36.211 V11.6.0 (Sep. 2014); "Technical Specification Group Radio Access Network; Evolved Universal Terrestrial Radio Access (E-UTRA); Physical channels and modulation (Release 11)," 120 pages.

Ericsson, NSN; "On Reduced UE Bandwidth and Enhanced Coverage for MTC," 3GPP TSG-RAN WG1 Meeting #77 R1-142541; Agenda item: 6.2.2.3; Seoul, Korea, May 19-23, 2014; 2 pages.

Huawei et al.; "Bandwidth reduction for low cost MTC UE and text proposal," 3GPP TSG RAN WG1#68 R1-120051; Agenda Item: 7.7.1; Dresden, Germany, Feb. 6-10, 2012; 9 pages.

Huawei et al.; "Discussion on the resource allocation for low cost MTC UEs," 3GPP TSG RAN WG1 Meeting #76bis R1-141119; Agenda Item: 7.2.2.1; Shenzhen, China, Mar. 31-Apr. 4, 2014; 3 pages.

Intel Corporation; "Remaining issues for low cost MTC UE," 3GPP TSG-RAN WG1 #77 R1-142024; Agenda item: 6.2.2.1; Seoul, Korea, May 19-23, 2014; 7 pages.

Mediatek Inc.; "On the need of PDCCH for SIB, RAR and Paging," 3GPP TSG-RAN WG1 #76 R1-140239; Agenda Item: 7.2.2.2.3; Prague, Czech Republic, Feb. 10-14, 2014; 4 pages.

Microsoft Corporation; "Consideration on UE complexity reduction," 3GPP TSG-RAN WG1 Meeting #78bis R1-144246; Agenda item: 7.3.1.1.1; Ljubljana, Slovenia, Oct. 6-10, 2014; 4 pages.

Gang et al.; "Enhanced Node B (ENB) and Method for MTC Coexistence," U.S. Appl. No. 14/667,430 filed Mar. 24, 2015; 63 pages.

International Search Report and Written Opinion for Patent Application No. PCT/US2015/036706 dated Nov. 4, 2015; 12 pages.

International Search Report and Written Opinion for Patent Application No. PCT/US2015/046548 dated Dec. 28, 2015; 14 pages.

United States Patent Office; Office Action for U.S. Appl. No. 14/692,510 dated Jun. 28, 2017; 42 pages.

United States Patent Office; Office Action for U.S. Appl. No. 14/692,510 dated Dec. 30, 2016; 46 pages.

International Search Report and Written Opinion for Patent Application No. PCT/US2015/054089 dated Jan. 8, 2016; 17 pages.

(56) References Cited

OTHER PUBLICATIONS

United States Patent Office; Office Action for U.S. Appl. No. 14/711,701 dated Mar. 31, 2017; 16 pages.
United States Patent Office; Notice of Allowance for U.S. Appl. No. 14/711,701 dated Jul. 3, 2017; 8 pages.
United States Patent Office; Office Action for U.S. Appl. No. 14/711,701 dated Oct. 6, 2016; 19 pages.
International Search Report and Written Opinion for Patent Application No. PCT/US2015/054318 dated Jan. 4, 2016; 13 pages.
Ericsson et al.; "New WI proposal: Further LTE Physical Layer Enhancements for MTC," 3GPP TSG RAN Meeting #65 RP-141660; Agenda Item: 14.1.1; Edinburgh, Scotland, Sep. 9-12, 2014; 9 pages.
3GPP TS 36.213 V12.3.0 (Sep. 2014); "Technical Specification Group Radio Access Network; Evolved Universal Terrestrial Radio Access (E-UTRA); Physical layer procedures (Release 12)," 212 pages.
ZTE; "SIB Coverage Improvement for MTC UEs," 3GPP TSG RAN WG1 Meeting #76 R1-140281; Agenda item: 7.2.2.2.1; Prague, Czech Republic, Feb. 10-14, 2014; 5 pages.
Office Action dated Jan. 23, 2018 from Japanese Patent Application No. 2016-572695, 12 pages.
Mediatek Inc., "Discussion on Measurement Gap Signalling for Rel-10 CA UE," 3GPP TSG RAN WG2 #72bis, R2-110265, Agenda Item: 7.1.1, Jan. 17-21, 2011, Dublin, Ireland, 5 pages.
Notice of Second Preliminary Rejection dated Feb. 19, 2018 from Korean Patent Application No. 10-2016-7033401, 10 pages.
Extended European Search Report dated Nov. 6, 2017 from European Patent Application No. 15815552.3, 25 pages.

\* cited by examiner

SYSTEM AND METHOD FOR MEASUREMENT REPORTING IN AN UNLICENSED SPECTRUM

CROSS REFERENCE TO RELATED APPLICATIONS

This application claims priority under 35 U.S.C. § 119(e) to U.S. Provisional Patent Application No. 62/020,316, entitled "System and Method on Measurement Report for LTE Unlicensed System" and filed Jul. 2, 2014 and U.S. Provisional Patent Application No. 62/072,861, entitled "System and Method on Measurement Report for LTE Unlicensed System" and filed Oct. 30, 2014. The disclosures of these provisional applications are incorporated herein by reference.

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

In communicating in a radio access network, a mobile terminal and a base station may communicate in a frequency band. Radio frequency bands may be regulated, for example, by the government. A frequency band may be licensed so that communication may occur in that band. Pursuant to the licensing of a frequency band, a mobile terminal and a base station may be configured to communicate in that frequency band. Due to increasing demand for high data rates over wireless networks, the unlicensed spectrum is being examined for the potential to increase data throughput.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, circuitry may be implemented in, or functions associated with the circuitry may be implemented by, one or more software or firmware modules.

Figure 1:
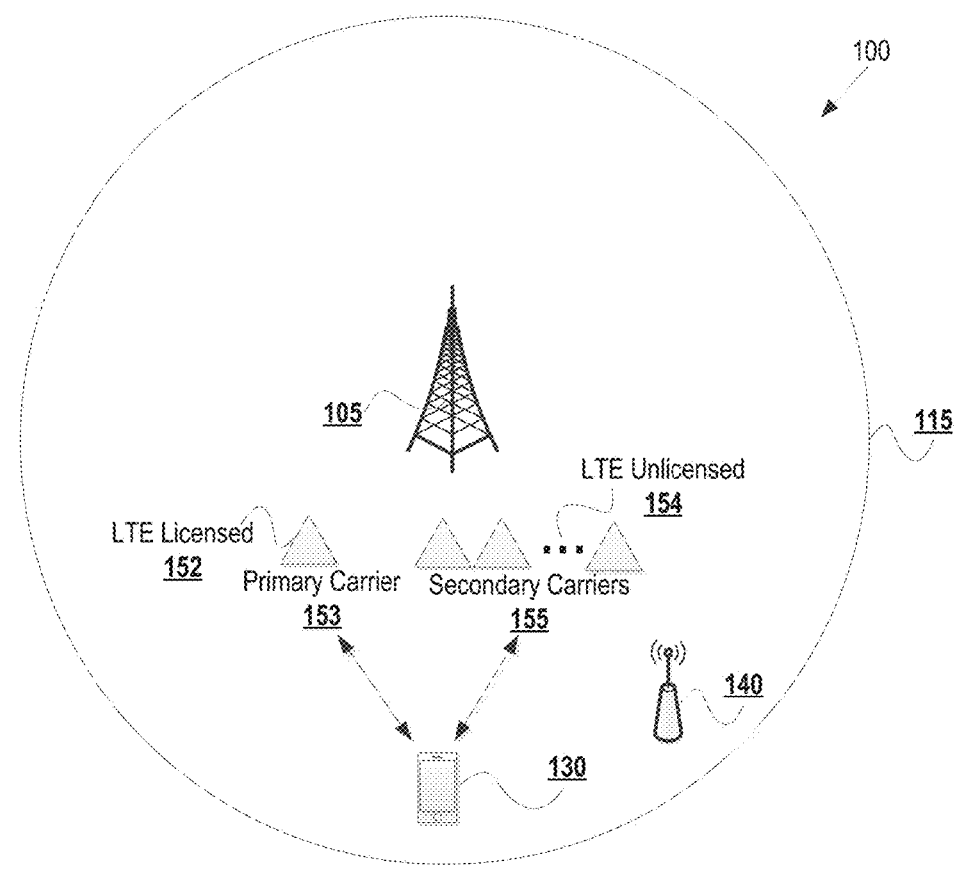
FIG. 1 is a block diagram showing an environment in which an evolved Node B may communicate data with a user equipment in an licensed spectrum and an unlicensed spectrum, in accordance with various embodiments.

Beginning first with FIG. 1, a block diagram shows an environment 100 in which an evolved Node B (eNB) 105 may communicate data with a user equipment (UE) 130 in an licensed spectrum and an unlicensed spectrum, in accordance with various embodiments. In a convention network that adheres to a Long Term Evolution (LTE) standard, the system may utilize a spectrum that is exclusively assigned to an LTE service provider or operator. This licensed spectrum may be referred to as LTE in Licensed Spectrum or simply LTE. However, due to increasing demand for wireless broadband data, there is potential to increase data throughput of an LTE system by transmitting data through an unlicensed spectrum as well as a licensed spectrum. The LTE system operating in an unlicensed spectrum is often referred to as LTE in Unlicensed Spectrum or LTE-U.

The UE 130 may be any type of computing device equipped with broadband circuitry and adapted to operate on a cell (e.g., the cell 115) according to, for example, one or more 3$^{rd}$ Generation Partnership (3GPP) technical specifications. For example, the UE 130 may be a netbook, a tablet computer, a handheld computing device, a web-enabled appliance, a gaming device, a mobile phone, a smartphone, an eBook reader, a personal data assistant, or the like. In another embodiment, the UE 130 may be a computing device that is not primarily adapted for user communications (e.g., voice calling, text/instant messaging, web browsing), such as a smart metering device, payment device (e.g., a "pay-as-you-drive" device), a vending machine, a telematics system (e.g., a system adapted for tracking and tracing of vehicles), a security system (e.g., a surveillance device), and the like.

According to embodiments, the UE 130 may be configured for intersystem communication by operating on at least one wireless cell 115. The wireless cell 115 may be provided by the eNB 105. In embodiments, the UE 130 and the eNB 105 may communicate over an air interface that is defined by one or more 3GPP standards, e.g., Evolved Universal Terrestrial Radio Access Network (e-UTRAN). The eNB 105 may act as a mobility anchors towards a core network (not shown). The eNB 105 may connect the UE 130 to a core network, for example, as part of a third Generation (3G), fourth Generation (4G), fifth Generation (5G), or beyond system that adheres to one or more standards, such as Long Term Evolution (LTE), LTE-Advanced (LTE-A), or other similar standard.

In LTE-U, carrier aggregation mechanisms (CA) may be employed to leverage the unlicensed spectrum as a complement to a licensed spectrum, for example, to offload best-effort traffic. CA mechanisms employed by the eNB 105 in the environment 100 may adhere to one or more LTE and/or LTE-A specifications. As illustrated, the eNB 105 may communicate with the UE 130 in both an LTE licensed spectrum 152 (herein, "LTE") and an LTE unlicensed spectrum 154 (herein, "LTE-U"). In various embodiments, the LTE-U 154 may include various unlicensed spectrums, for example, that are used for WiFi communication or other wireless communication. For example, LTE-U 154 may include five (5) gigahertz (GHz) Unlicensed National Information Infrastructure (U-NII) wireless local area network (WLAN) systems, such as those using the Institute of Electrical and Electronics Engineers (IEEE) 802.11 a/n/ac technologies.

In various embodiments, the eNB 105 may communicate with the UE 130 using both a primary carrier 153 in LTE 152 and one or more secondary carriers 155 in LTE-U 154. In one embodiment, the primary carrier 153 may carry critical control signaling, mobility, and user data that require high quality of service while less-demanding (e.g., best-effort) traffic is carried on the secondary carriers 155. In one embodiment, the UE 130 may operate on both a primary cell (Pcell) in LTE provided by the eNB (e.g., cell 115), as well as a secondary cell (Scell) in an unlicensed spectrum provided by another access node 140. Accordingly, the primary carrier 153 would go through the Pcell 115 and the secondary carriers 155 would go through the Scell provided by access node 140.

In one example, LTE-U 154 may be within the 5 GHz band. Often, the 5150-5250 MHz band and 5250-5350 MHz band are widely used for residential WLAN communication. Thus, those 200 MHz may be available as LTE-U 154. If twenty (20) MHz is allocated for component carriers (CCs), then ten (10) component carriers may comprise secondary carriers 155. It is understood that this allocation arrangement is for illustrative purposes only and, therefore, a different number of component carriers and/or bandwidths allocated for component carriers are contemplated.

In connection with operation using unlicensed frequency spectrum(s), measurement reporting on LTE-U 154 may facilitate coexistence between other unlicensed carriers (e.g., WiFi carriers). Both periodic and aperiodic channel quality indicator (CQI) reporting may be supported. In embodiments, the eNB 105 may instruct the UE 130 to send individual CQI reports embedded in one or more resources scheduled for uplink data transmission. For example, a physical uplink control channel (PUCCH) may be used for periodic CQI reporting while a physical uplink shared channel (PUSCH) may be used for aperiodic CQI reporting. For some downlink transmission modes, additional feedback signaling comprising Precoding Matrix Indicators (PMIs) and/or Rank Indications (RIs) may be transmitted to the UE 130 by the eNB 105.

Figure 2:
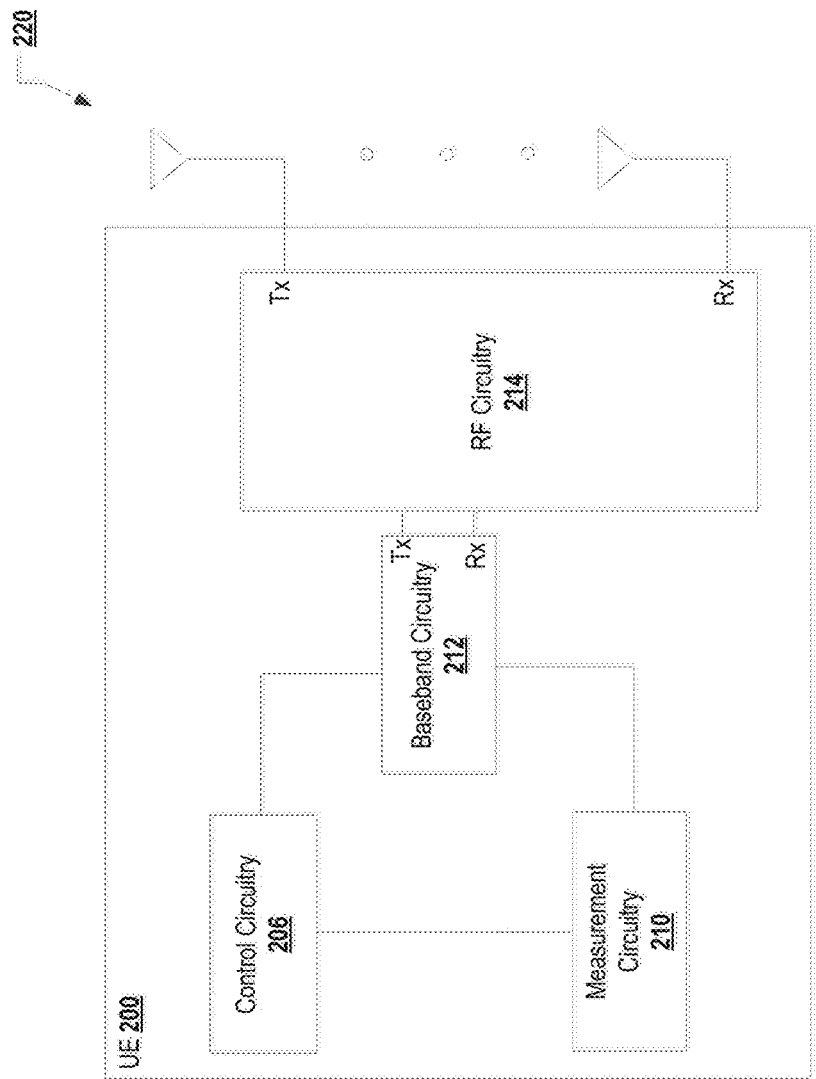
FIG. 2 is a block diagram illustrating a user equipment configured to perform and report measurements associated with an unlicensed spectrum, in accordance with various embodiments.

With respect to FIG. 2, a block diagram illustrates UE 200 configured to perform and report measurements associated with an unlicensed spectrum, in accordance with various embodiments. In various embodiments, the UE 200 may be an embodiment of the UE 130 of FIG. 1. The UE 200 may include, among other components, control circuitry 206, measurement circuitry 210, baseband circuitry 212, and radio frequency (RF) circuitry 214, coupled together at least as shown. In some embodiments, one or more of the circuitries 206, 210, 212, 214 may be integrated together, for example, in a system on a chip (SoC) or other integrated circuit. For example, in some embodiments the control circuitry 206, measurement circuitry 210, and baseband circuitry 212 may be integrated together in a baseband chipset.

In various embodiments, the RF circuitry 214 may be coupled with one or more antennas 220 to facilitate over-the-air communication of signals to/from the UE 200. Operations of the RF circuitry 214 may include, but are not limited to, filtering, amplifying, storing, transforming, and so forth of signals. In the transmit path (Tx), the RF circuitry 214 may comprise a power amplifier and/or upconverter. In the receive path (Rx), the RF circuitry 214 may comprise a low noise amplifier and/or downconverter.

In various embodiments, the baseband circuitry 212 may be configured to provide signals to the RF circuitry 214 for transmission over the air. Operations of the baseband circuitry 212 may include, but are not limited to, scrambling, multiplexing, coding, and so forth of signals. In the transmit path (Tx), the baseband circuitry 212 may be configured to perform coding and modulating of signals. In the receive path (Rx), the baseband circuitry 212 may be configured to perform decoding and demodulating of signals.

The baseband circuitry 212 may include or be communicatively coupled with control circuitry 206. In various embodiments, the control circuitry 206 may be configured to determine or detect that the UE 200 is configured to communicate through one or more unlicensed frequency bands. Further, the control circuitry 206 may detect the one or more unlicensed frequency bands.

The control circuitry 206 may be configured to generate at least one message that is to indicate the capability of the UE 200 to communicate through one or more unlicensed frequency bands and/or the one or more unlicensed frequency bands through which the UE 200 may communicate. This communication may be according to an LTE standard (including an LTE-A standard). In one embodiment, the control circuitry 206 may be configured to set at least one band combination in a supportedBandCombination information element (IE) of a UECapabilityInformation message. In embodiments, the UECapabilityInformation message may contain the set of unlicensed frequency bands and LTE licensed band(s) associated with enablement of CA between CCs on licensed and unlicensed bands. The UECapabilityInformation message may further include one or more subfields associated with enablement of CA between CCs on licensed and unlicensed bands, such as support bandwidth class and/or the corresponding multiple-input and multiple-output (MIMO) capability for downlink. While the UECapabilityInformation message may include information associated with one or more unlicensed bands, the UECapabilityInformation message may be received in a licensed band.

Similar to a signaling principle for LTE UE band combination(s), unlicensed frequency bands used by LTE-U may be labeled with one or more multiple frequency band roman numerals associated with a corresponding frequency allocation. In one embodiment, an unlicensed band in the 5170-5330 MHz (e.g., IEEE 8.0211x) may be numbered "X" and an unlicensed band in the 5490 and greater may be associated with UE LTE-U CA capability reporting. In such an embodiment, LTE-U operation on one or more unlicensed bands may include time division duplex (TDD) frame structure, including potential full downlink configuration (e.g., frequency division duplex (FDD) downlink only CC). Table 1 illustrates such an embodiment.

TABLE 1

5 GHz Unlicensed Bands for LTE Operation

| E-UTRA Operating Unlicensed Band | Uplink Operating Band eNB Receive and UE Transmit $F_{UL\_low}$-$F_{UL\_high}$ | Downlink Operating Band eNB Transmit and UE Receive $F_{DL\_low}$-$F_{DL\_high}$ | Duplex Mode |
|---|---|---|---|
| X | 5150 MHz-5250 MHz | 5150 MHz-5250 MHz | TDD |
| Y | 5250 MHz-5350 MHz | 5250 MHz-5350 MHz | TDD |
| Z | 5470 MHz-5725 MHz | 5470 MHz-5725 MHz | TDD |
| U | 5725 MHz-5850 MHz | 5725 MHz-5850 MHz | TDD |

In another embodiment, the control circuitry 206 may generate at least one message that is to indicate the capability of the UE 200 to communicate through one or more unlicensed frequency bands with an indication of its bandwidth classes for both licensed and unlicensed frequency bands and corresponding downlink MIMO capability—e.g., the at least one message may include a value "CA_1A-XC" may inform an eNB of the inter-band CA capability of UE 200 having a bandwidth class "A" on licensed frequency band 1 aggregated with bandwidth class "C" on unlicensed frequency band X.

In some embodiments, the control circuitry 206 may generate the at least one message to indicate a need for measurement gaps when operating on a licensed band and performing one or more measurements on the unlicensed frequency band. The control circuitry 206 may include such an indication in an interFreqNeedForGaps IE of a UECapabilityInformation message.

In support of communication with one or more unlicensed frequency bands, the UE 200 may report one or more measurements to an eNB facilitating such communication. In embodiments, the control circuitry 206 may process an indication received from the eNB to initiate one or more measurements on one or more unlicensed bands, such as those unlicensed bands indicated to the eNB in the capability message transmitted by the UE 200 to the eNB. In one embodiment, this indication may be included in a radio resource control (RRC) connection reconfiguration message. The RRC connection reconfiguration message may be transmitted to the UE 200 via a licensed frequency band when the UE 200 is operating in an RRC_Connected mode. In various embodiments, this indication may trigger channel occupany status (COS) and/or channel state information (CSI) reporting by the control circuitry 206 and/or may define at least one event and/or period that is to trigger COS and/or CSI reporting by the control circuitry 206.

In various embodiments, the indication may include one or more of a measurement identifier (ID), a measurement type, a command (e.g., setup, modify, release), a measurement object, a measurement quantity, a reporting quantity, and a reporting criteria (e.g., periodic or aperiodic/event-triggered). A measurement type may indicate a type of measurement to be performed by the UE 200 (e.g., intra-frequency, inter-frequency, and/or inter-radio access technology (RAT)). A measurement object may indicate a band one which the UE 200 is to perform the measurement (e.g., an unlicensed band). A measurement quantity may indicate what is to be measured (e.g., Reference Signal Received Power (RSRP, Reference Signal Received Quality (RSRQ), Received Signal Strength Indicator (RSSI), etc.). A reporting quantity may indicate what to report (e.g., active cells, monitored cells, and/or detected cells, such as Scells). A reporting criterion may indicate whether the UE 200 is to periodically transmit measurement reports or aperiodically transmit measurement reports (e.g., based on detection of an event).

The control circuitry 206 may be communicatively coupled with measurement circuitry 210 configured to perform one or more measurements based on the indication. In various embodiments, the control circuitry 206 may signal to the measurement circuitry 210 the one or more measurements to be performed and/or the one or more unlicensed bands on which to perform the one or more measurements. In response, the measurement circuitry 210 may perform the one or more measurements on the one or more unlicensed bands and compute one or more values based on the performed measurements. The measurement circuitry 210 may signal the one or more values to the control circuitry 206 so that the control circuitry 206 may transmit a measurement report that includes the one or more computed values to the eNB. In some embodiments, the measurement circuitry 210 may be configured to apply layer 3 filtering for one or more measurement quantities for evaluation of reporting criteria.

According to various embodiments, the measurement circuitry 210 may be configured to compute one or more values for CSI and/or COS reporting. The one or more values included in CSI reporting may be one or more of a channel quality indicator (CQI), a precoding matrix indicator (PMI), a precoding type indicator (PTI), and/or rank indication (RI). The one or more values channel included in COS reporting may be an indication of busy and/or idle (e.g., a Boolean value or binary value) and/or a value from which the eNB may determine channel status. Other values may be signaled by the measurement circuitry 210 to the control circuitry 206 for reporting to the eNB.

In one embodiment, the measurement circuitry 210 may be configured to compute a value for an RSSI for COS reporting. RSSI is the total received wideband power including all interference and thermal noise and may be used to indicate whether the measured frequency band is occupied, for example, by WiFi or LTE. In one embodiment, RSSI on an unlicensed carrier may be defined as the wide-band received power within the relevant channel bandwidth and may have a reference point at a connector of an antenna 220. The RSSI may be applicable for inter-RAT whether the UE 200 is operating in an RRC_Connected mode or an RRC_Idle mode.

In another embodiment, the measurement circuitry 210 may be configured to compute a value for RSRP for COS reporting. RSRP is the linear average over the power of the resource elements that carry cell-specific reference signals over the considered measurement bandwidth. This measured value may be used to indicate whether the measured frequency band is occupied by LTE.

In another embodiment, the measurement circuitry 210 may be configured to compute a value for RSRQ for COS reporting. RSRQ is the radio between the RSRP and RSSI, dependent upon the measurement bandwidth. As RSRQ combines signal strength as well as interference level, this measurement value provides additional help for mobility decisions. This measured value may be used to indicate whether the measured frequency band is occupied by LTE.

In one embodiment, the measurement circuitry 210 may compute a value for RSRQ or RSRP using one or more cell-specific reference signals (CRS), a channel state information reference signal (CSI-RS), or an LTE-U-specific reference signal (e.g., a reference signal transmitted every several milliseconds (ms), such as every 5 ms, 10 ms, or 40 ms).

In another embodiment, the measurement circuitry 210 may compute a value that is to indicate whether a measured frequency band is busy or idle for COS reporting. This value may be a binary or Boolean value. For example, the measurement circuitry 210 may measure the RSSI for a frequency band and compare the measured RSSI value with an RSSI threshold (e.g., a predetermined threshold or a threshold defined by higher-layer signaling). If the RSSI value is greater than or equal to the RSSI threshold, the measurement circuitry 210 may indicate that the measured frequency band is busy (e.g., unoccupied); otherwise, the measurement circuitry 210 may indicate that the measured frequency band is idle (e.g., unoccupied).

In another embodiment, the measurement circuitry 210 may be configured to compute, for COS reporting, one or more values that indicate one or more frequency bands suitable for CA—e.g., the "best" unlicensed bands and/or the bands with the least potential interference. For example, the measurement circuitry 210 may perform RSSI measurement on a plurality of potential CCs in the unlicensed band(s) and determine one or more of the plurality of CCs that have the lowest RSSI value(s). The measurement circuitry 210 may signal these one or more CCs to the control circuitry 206 for reporting to the eNB.

In another embodiment, the measurement circuitry 210 may be configured to compute, for COS reporting, a value for a time period associated with comparison of detected interference and/or thermal noise to a listen-before-talk (LBT) threshold. For example, a first value may be a time period in which a total received power, including all interference and/or thermal noise, measured by the measurement circuitry 210 is equal to or larger than the LBT threshold, and a second value may be a time period in which a total received power, including all interference and/or thermal noise, measured by the measurement circuitry 210 is less than the LBT threshold. The LBT threshold may be defined as a function of operating frequency (e.g., eNB transmission power) or may be signaled to the UE 200 using UE-specific (e.g., RRC) signaling or cell-specific signaling.

In such embodiments, the measurement circuitry 210 may signal, to the control circuitry 206, the first value and/or the second value in combination with one or more values for RSSI, RSRP, and/or RSRQ for the time periods during which the first value or the second value was measured. The control circuitry 206 may cause transmission of these values to the eNB so that the eNB may determine idle and/or busy periods (e.g., when a measured band is occupied by WiFi and/or other LTE).

In various embodiments, the measurement circuitry 210 may perform a plurality of the measurements described herein and signal corresponding values to the control circuitry 206. The control circuitry 206 may accordingly cause transmission of the values to the eNB for COS reporting. Further, the measurement circuitry 210 may perform one or more measurements for a plurality of CCs (e.g., all available CCs) and signal corresponding values e to the control circuitry 206. In one embodiment, the plurality of CCs for which the measurement circuitry 210 is to perform measurements may be signaled by the eNB via UE-specific (e.g., RRC) signaling or cell-specific signaling. In another embodiment, the plurality of CCs for which the measurement circuitry 210 is to perform measurements may be predetermined.

In various embodiments, the control circuitry 206 may generate one or more messages based on one or more values computed by the measurement circuitry 210 and cause transmission of the same to the eNB. This control circuitry 206 may cause this transmission periodically or aperiodically, for example, based on an indication received from the eNB (e.g., in a message including the indication for measurement reporting).

In various embodiments, the control circuitry 206 may be triggered for COS reporting based on an uplink grant. The COS reporting may be mapped on a PUSCH to be carried on a single uplink CC indicated by the uplink grant containing aperiodic COS triggering. When the control circuitry 206 detects aperiodic COS reporting, the control circuitry 206 may multiplex COS reporting data (e.g., one or more values for one or more measurements) together with existing uplink control information (UCI) and/or data in a PUSCH. The control circuitry 206 may cause the baseband circuitry 212 to jointly or separately encode bits associated with COS reporting with bits associated with CSI reporting.

For aperiodic measurement reporting, downlink control information (DCI) formats 0 and 4 may be used for scheduling uplink transmission. For these two DCI formats, a channel-state information (CSI) request field may be used to trigger CSI feedback. In particular, the control circuitry 206 may detect an explicit request from the eNB for an aperiodic channel state report to be transmitted on a physical uplink shared channel (PUSCH) by setting one or more bits in the uplink grant. For CA, two bits may be used to indicate for which downlink CCs CSI should be reported.

In connection with LTE-U, the number of bits (e.g., two bits) for a CSI request field may be redefined and/or extended, for example, for DCI formats 0 and 4 mapped onto UE-specific search space (USS). Zero-padding bits may be appended to CSI format 0 mapped onto USS to facilitate a same payload size of DCI format 0 and 1A.

In one embodiment, aperiodic COS reporting may be triggered in the control circuitry 206 according to Table 2. In such an embodiment, the UE 200 may be configured with one or more serving cells on an unlicensed band. The control circuitry 206 may perform the aperiodic COS reporting together with aperiodic CSI reporting using a corresponding PUSCH upon decoding an uplink DCI or random access response grant. One or more serving cells configuration(s) associated with one CSI request field (e.g., "10") may be jointly configured or separately configured with different IEs.

on the USS. The control circuitry 206 may cause transmission of the COS reporting together with CSI reporting using the corresponding PUSCH.

According to one example of such an embodiment, the control circuitry 206 may detect a combination of CCs for which COS reporting is to be performed. The control circuitry 206 may detect a combination of CCs through higher layer signaling, e.g., RRC signaling. In one embodiment, the number of CCs for the combination may be predefined.

In another embodiment of aperiodic measurement reporting, the control circuitry 206 may be triggered to send at least a COS report based on an additional field associated with a CSI request field. In such an embodiment, a CSI request may include additional bits (e.g., two or four additional bits) associated with a request for COS reporting.

For example, the control circuitry 206 may detect a combination of serving cells on an unlicensed band and serving cells on a licensed band for COS and CSI reporting. According to such an example, the measurement circuitry 210 may be configured to perform RSSI measurements on a plurality of CCs (e.g., 10). The control circuitry 206 may detect a CSI request field having additional bits which cause the control circuitry 206 to signal the measurement circuitry 210 to perform RSSI measurements on one or more CCs—e.g., "0000" may indicate the measurement circuitry 210 is to perform RSSI measurement for CCs associated with an index 5 on an unlicensed band and CCs associated with an index 3 on a licensed band, "0001" may indicate the measurement circuitry 210 is to perform RSSI measurement for CCs associated with an index 1 on an unlicensed band together with CSI reporting on CCs associated with indexes 1 and 2 on a licensed band, etc.

In another example of such an embodiment, the control circuitry 206 may detect a CSI request field having three bits. In such an example, detection of "000" by the control circuitry 206 may cause the control circuitry 206 to signal to the measurement circuitry 210 that the measurement circuitry 210 is to identify an unoccupied CC among configured CCs on an unlicensed band (e.g., a "best" unoccupied CC and/or an unoccupied CC having lower measured interference). Similarly, detection of "001" by the control circuitry 206 may cause the control circuitry 206 to signal to

TABLE 2

CSI request field for (enhanced) physical downlink control channel with uplink DCI format in USS

| Value of CSI Request Field | Description |
|---|---|
| 00 | No aperiodic COS report is triggered |
| 01 | Aperiodic COS report is triggered for serving cell c on unlicensed ban (for the case that uplink transmission is supported on LTE-U serving cell c) or a third set of serving cells on the unlicensed band is configured by higher layers (if the uplink transmission is not supported on LTE-U serving cells) |
| 10 | Aperiodic COS report is triggered for a first set of serving cells on unlicensed band configured by higher layers |
| 11 | Aperiodic COS report is triggered for a second set of serving cells configured by higher layers |

In another embodiment of aperiodic measurement reporting, the control circuitry 206 may be triggered to send at least a COS report based on an additional field associated with a DCI format. In such an embodiment, a DCI format may include a further field (e.g., a two-bit field). The control circuitry 206 may detect this further field of the DCI format the measurement circuitry 210 that the measurement circuitry 210 is to identify two unoccupied CCs among configured CCs on an unlicensed band (e.g., two "best" unoccupied CCs and/or two unoccupied CCs having lowest measured interference). While the preceding two examples are illustrated in reference to a CSI request field having additional bits, similar examples are contemplated herein where the control circuitry 206 is configured to detect additional bits in a DCI format.

In another embodiment, the control circuitry 206 may be configured for transmission of aperiodic CSI reporting without transmission of COS reporting. For example, the control circuitry 206 may be configured to cause the measurement circuitry 210 to perform measurements on one or more CCs on an unlicensed band and select one or more of those CCs that are best (e.g., CCs having measurements indicating the lowest interference and/or thermal noise, etc.). According to such an embodiment, the control circuitry 206 may be configured to transmit CSI reporting for these selected CCs in the unlicensed band. In such an embodiment, the control circuitry 206 may be configured to include one or more bits corresponding to each selected CC to indicate the serving cell(s) for which CSI reporting is included. The number of CCs to be selected may be predetermined (e.g., defined in a specification), detected by the control circuitry 206 through higher layer signaling, or detected by the control circuitry 206 in a CSI request field.

For periodic measurement reporting, PUCCH format 2/2a/2b/3 may be used for transmission of CSI reporting on the PUCCH. In particular, CQI information may be coded using a (20, A) Reed-Muller code where transmitted with PUCCH format 2/2a/2b.

In various embodiments, the control circuitry 206 may cause COS reporting in association with PUCCH format 2. Depending on the number of bits associated with COS reporting, the control circuitry 206 may cause multiple values for multiple serving cells and/or CCs of an unlicensed band to be aggregated and transmitted in a single PUCCH instance, or the control circuitry 206 may cause the baseband circuitry 212 to multiplex the bits according to time-division multiplexing (TDM). For TDM, the control circuitry 206 may configure COS reporting for each CC with a different offset such that COS reporting for each CC does not collide. Further, the control circuitry 206 may detect dedicated resource allocation for LTE-U PUCCH format 2 transmission, for example, through higher layer signaling.

In one embodiment, the control circuitry 206 may be configured to report, in response to a request from an eNB, one or more unoccupied CCs among a plurality of CCs of an unlicensed band. For example, the control circuitry 206 may be configured to report the two best CCs among 8 CCs, and the number of bits associated with COS reporting may be 6. For periodic CSI and COS reporting for CCs on an unlicensed band, the control circuitry 206 may be configured to transmit reporting for different CCs with different offset values in the time domain. In the event that periodic CSI and COS reporting collide in a same subframe, different reports may be prioritized according to a predetermined prioritization list.

In another embodiment of periodic reporting, the control circuitry 206 may be configured to report RSSI measurement values for a plurality of CCs (e.g., two) of an unlicensed band, and bits (e.g., eight) associated with a respective RSSI measurement value for a respective CC may be transmitted on PUCCHs with a different offset in the time domain.

In another embodiment of periodic reporting, PUCCH format 2/2a/2b may be extended to support LTE-U measurement reporting. In particular, the control circuitry 206 may cause the baseband circuitry 212 to multiplex bits associated with COS reporting with bits associated with CQI and/or RI before channel coding in the baseband circuitry 212. This extension of the PUCCH format 2/2a/2b may be appropriate when the total number of bits associated with COS reporting is relatively small.

In another embodiment of periodic reporting, PUCCH format 3 may be reused to support LTE-U measurement reporting. Given that forty-eight encoded bits may be transmitted in one PUCCH format 3, the control circuitry 206 may cause bits associated with multiple measurement values for COS reporting to be aggregated, jointly or separately encoded by the baseband circuitry 212, and transmitted on a single PUCCH instance. The control circuitry 206 may be configured to identify the PUCCH resource, for example, based on higher layer signaling (e.g., RRC).

Figure 3:
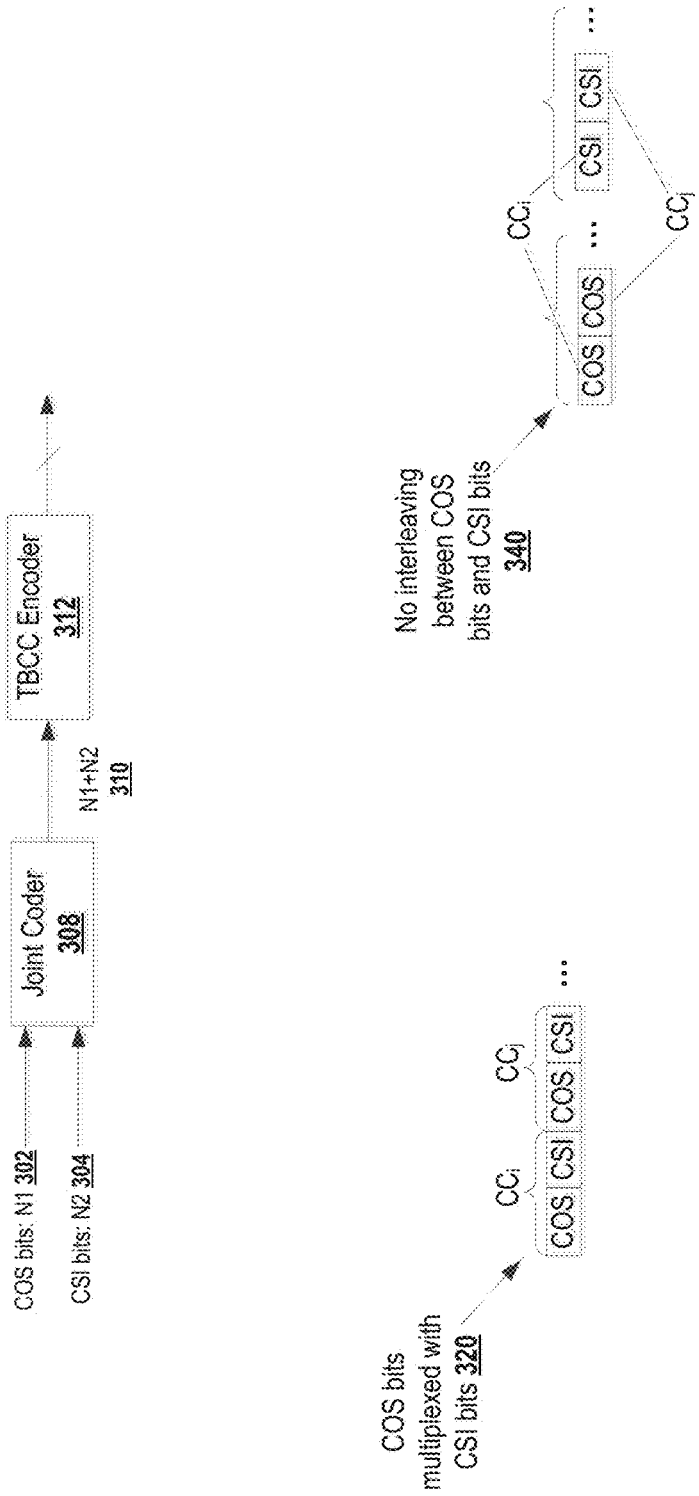
FIG. 3 is a block diagram illustrating encoding of bits associated with channel occupancy status reporting and channel-state information reporting, in accordance with various embodiments.

With respect to FIG. 3, a block diagram illustrates encoding of bits associated with COS reporting and CSI reporting, in accordance with various embodiments. In various embodiments, the joint coder 308 and/or the tail biting convolutional encoding (TBCC) encoder 312 may be included in the baseband circuitry of an LTE-U UE, such as baseband circuitry 212, which may operate in response to signals from the control circuitry 206 of FIG. 2.

In embodiments, bits associated with COS reporting may be jointly encoded with bits associated with CSI reporting. In embodiments, bits associated with COS reporting N1 302 and bits associated with CSI reporting N2 304 may be multiplexed 320 and may be signaled to a joint coder 308. The joint coder 308 may encode the multiplexed bits 320 and signal the multiplexed and jointly encoded bits 310 to the TBCC encoder 312. From the TBCC encoder 312, data symbols associated with the encoded bits may be mapped from beginning data resources across a full subframe duration.

In another embodiment, bits associated with COS reporting N1 302 and bits associated with CSI reporting N2 304 are not interleaved 340 but may be signaled to a joint coder 308. The joint coder 308 may encode the non-interleaved bits 340 and signal the jointly encoded bits 310 to the TBCC encoder 312. From the TBCC encoder 312, data symbols associated with the encoded bits may be mapped from beginning data resources across a full subframe duration.

Alternatively, the joint encoder 308 may be coupled with a turbo encoder (not shown) in addition to TBCC encoder 312 for a conditional encoder selection scheme according to a size of a payload including bits associated with COS reporting N1 302 and bits associated with CSI reporting N2 304. After concatenation of bits associated with COS reporting N1 302 and bits associated with CSI reporting N2 304 in the joint encoder 308, the jointly encoded bits 310 may either be signaled to the TBCC encoder 312 or the turbo encoder.

In such an embodiment, whether the TBCC encoder 312 or the turbo encoder is employed may be contingent upon a size of the jointly encoded bits 310. For example, two thresholds $K_{bit,0}$ and $K_{bit,1}$ may be configured (e.g., through higher layer signaling). If the size of the jointly encoded bits 310 is greater than $K_{bit,1}$ then the turbo encoder may be used and if the size of the jointly encoded bits 310 is less than $K_{bit,0}$ then Block coding (32,0) may be used; otherwise, TBCC 312 may be used to encode the jointly encoded bits 310. Generally, there is frequently a gain with turbo coding compared to TBCC when a payload size exceeds a threshold, which may occur in LTE-U scenarios considering the number of CCs on an unlicensed band is often appreciably large. In some embodiments, these encoding schemes may be used even for CSI reporting without bits associated with COS reporting.

Figure 4:
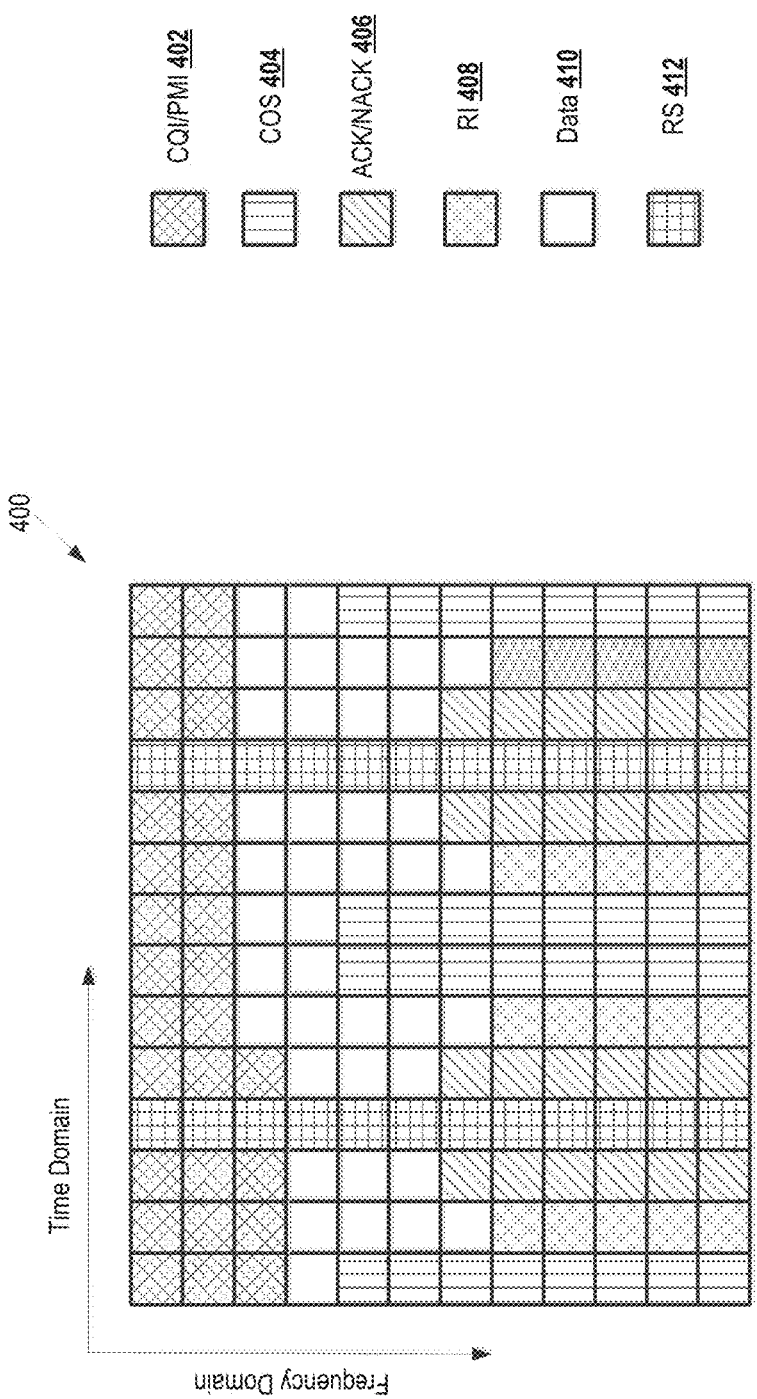
FIG. 4 is a block diagram illustrating resource elements of a physical uplink shared channel having symbols associated with channel occupancy status reporting, in accordance with various embodiments.

With respect to FIG. 4, a block diagram illustrates resource elements 400 of a PUSCH having symbols associated with COS reporting, in accordance with various embodiments. In one embodiment, symbols may be mapped onto resource elements 400 by baseband circuitry of an LTE-U UE, such as baseband circuitry 212 of FIG. 2. In the resource elements 400, bits associated with CSI reporting and bits associated with COS reporting may be separately encoded. According to embodiments, bits associated with COS reporting may be separately encoded and then mapped to resource elements 400 within the physical resource blocks (PRBs) where a PUSCH is transmitted. In the illustrated embodiment, bits associated with COS reporting are mapped to the first and last symbols 404 next to symbols 408 for RI associated with CSI reporting. Symbols 410 associated with data are rate-matched around the COS symbols 404.

Figure 5:
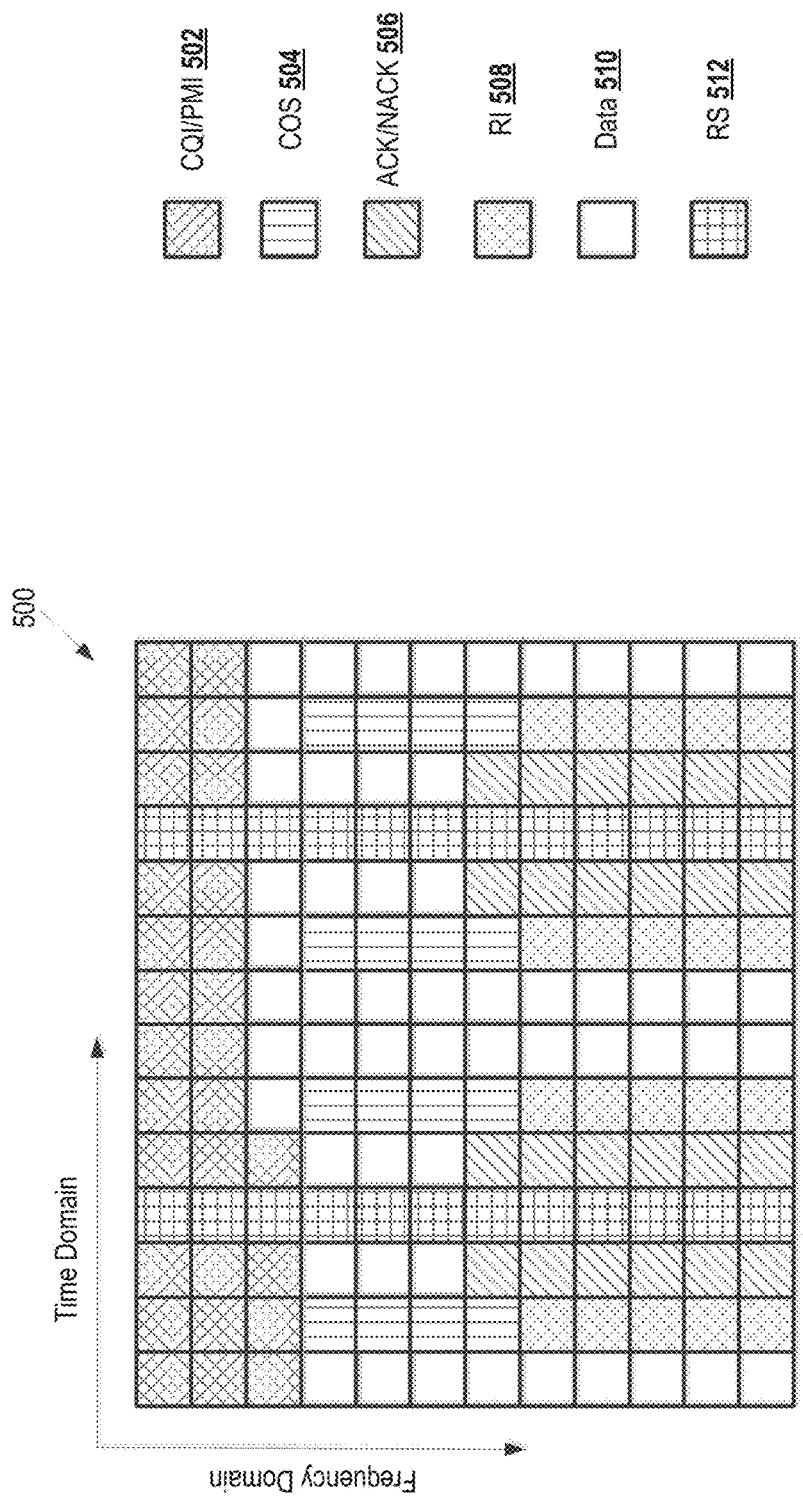
FIG. 5 is a block diagram illustrating another embodiment of resource elements of a physical uplink shared channel having symbols associated with channel occupancy status reporting, in accordance with various embodiments.

With respect to FIG. 5, a block diagram illustrates resource elements 500 of a PUSCH having symbols associated with COS reporting, in accordance with various embodiments. In one embodiment, symbols may be mapped onto resource elements 500 by baseband circuitry of an LTE-U UE, such as baseband circuitry 212 of FIG. 2. In the resource elements 500, bits associated with CSI reporting and bits associated with COS reporting may be separately encoded. According to embodiments, bits associated with COS reporting may be separately encoded and then mapped to resource elements 500 within the PRBs where a PUSCH is transmitted. In the illustrated embodiment, bits associated with COS reporting are mapped to symbols 504 that are the same as symbols 508 RI near reference signal (RS) symbols 512.

Figure 6:
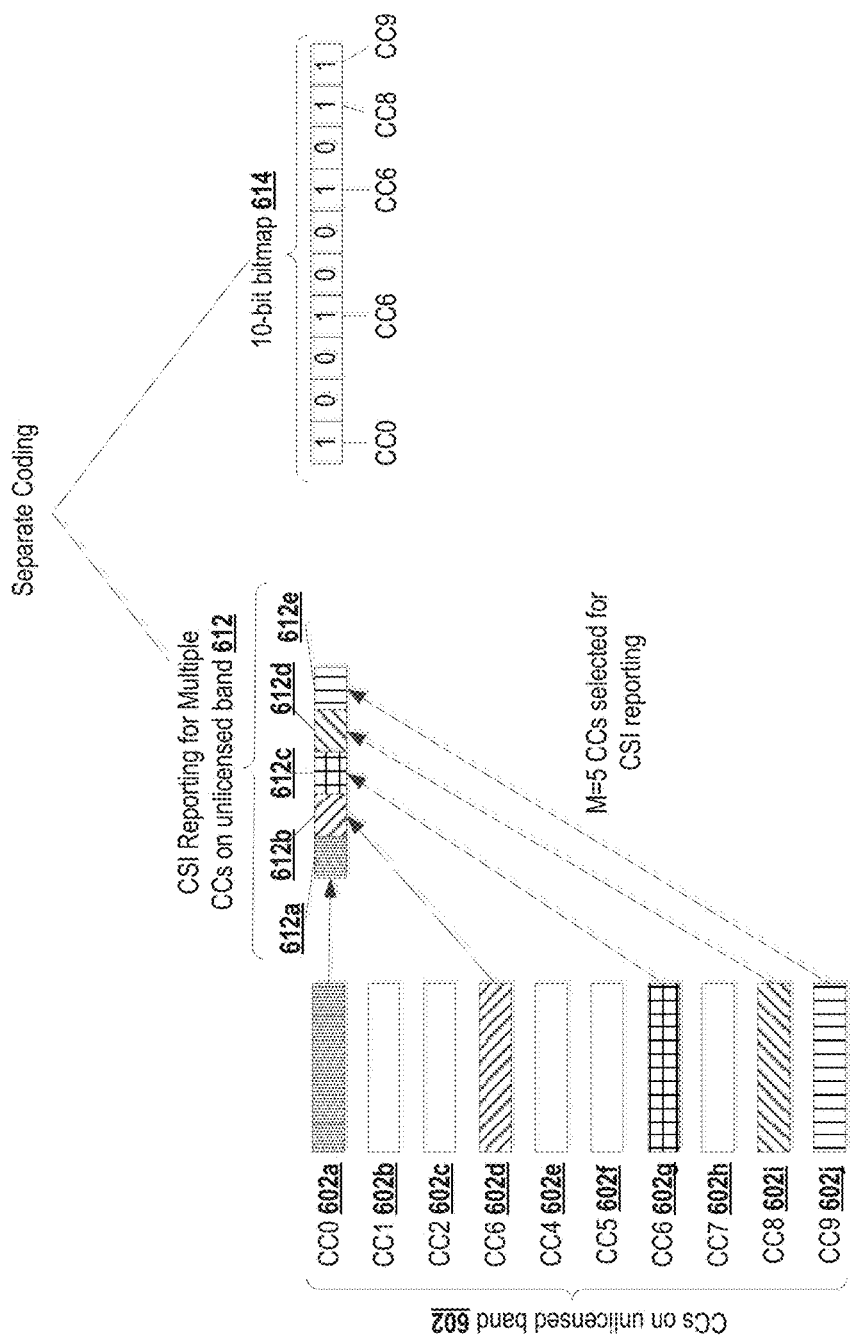
FIG. 6 is a block diagram illustrating channel-state information reporting for component carriers on an unlicensed band, in accordance with various embodiments.

Turning to FIG. 6, a block diagram illustrates CSI reporting for CCs on an unlicensed band, in accordance with various embodiments. According to an embodiment, the CSI reporting for CCs on an unlicensed band may be performed by control circuitry of an LTE-U UE, such as control circuitry 206 of FIG. 2. (e.g., to signal selected CCs to an eNB without explicit COS reporting).

In the illustrated embodiment, ten CCs 602a-j may be configured on an unlicensed band. A ten-bit bitmap 614 may be configured for CSI reporting. In embodiments, an LTE-U UE may be configured to select a number M associated with CSI reporting for CCs on an unlicensed band, depending on one or more measurements performed by the LTE-U UE on the CCs 602a-j. In embodiments, the LTE-U UE may be configured to select a plurality of CCs 602a, d, g, i, j based on measurements performed on the CCs 602a-j. The selected CCs 602a, d, g, i, j may be those having one or more measurements indicating lower interference and/or thermal noise than other CCs. The LTE-UE may be configured to perform CSI reporting for the selected CCs 602a, d, g, i, j and transmit multiple CSI reports 612a-e to an eNB together with a bitmap 614 indicating the CCs 602a, d, g, i, j of the plurality of CCs 602a-j having CSI reporting. The CSI reports 612a-e and the bitmap 614 may be separately encoded.

Figure 7:
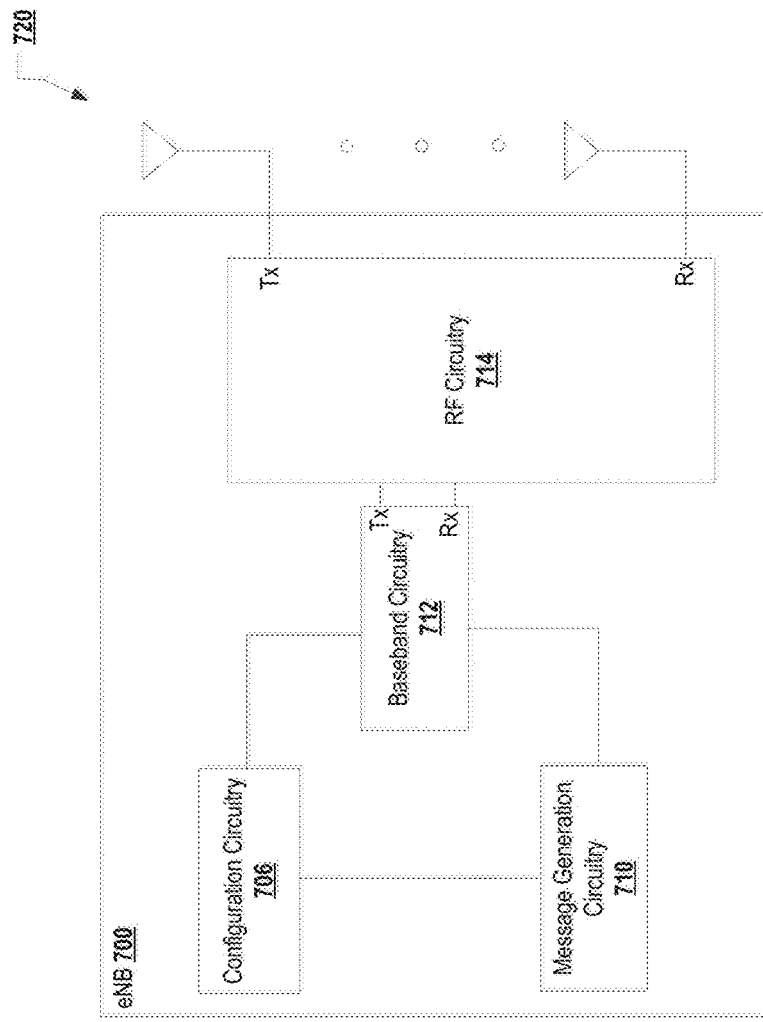
FIG. 7 is a block diagram illustrating an evolved Node B to configure communication with a user equipment in an unlicensed band, in accordance with various embodiments.

Turning to FIG. 7, a block diagram illustrates an eNB 700 to configure communication with a UE (not shown) in an unlicensed band, in accordance with various embodiments. In various embodiments, the eNB 700 may be an embodiment of the eNB 105 of FIG. 1. The eNB 700 may include, among other components, configuration circuitry 706, message generation circuitry 710, baseband circuitry 712, and RF circuitry 714, coupled together at least as shown. In some embodiments, one or more of the circuitries 706, 710, 712, 714 may be integrated together, for example, in a system on a chip (SoC) or other integrated circuit. For example, in some embodiments the configuration circuitry 706, message generation circuitry 710, and baseband circuitry 712 may be integrated together in a baseband chipset.

In various embodiments, the RF circuitry 714 may be coupled with one or more antennas 720 to facilitate over-the-air communication of signals to/from the eNB 700. Operations of the RF circuitry 714 may include, but are not limited to, filtering, amplifying, storing, transforming, and so forth of signals. In the transmit path (Tx), the RF circuitry 714 may comprise a power amplifier and/or upconverter. In the receive path (Rx), the RF circuitry 714 may comprise a low noise amplifier and/or downconverter.

In various embodiments, the baseband circuitry 712 may be configured to provide signals to the RF circuitry 714 for transmission over the air. Operations of the baseband circuitry 712 may include, but are not limited to, scrambling, multiplexing, coding, and so forth of signals. In the transmit path (Tx), the baseband circuitry 712 may be configured to perform coding and modulating of signals. In the receive path (Rx), the baseband circuitry 712 may be configured to perform decoding and demodulating of signals.

The baseband circuitry 712 may include or be communicatively coupled with configuration circuitry 706. The configuration circuitry 706 may be configured to process at least one message that is to indicate the capability of the UE to communicate through one or more unlicensed frequency bands and/or the one or more unlicensed frequency bands through which the UE may communicate. This communication may be according to an LTE standard (including an LTE-A standard). In one embodiment, the configuration circuitry 706 may be configured to detect this capability based on reception of a UECapabilityInformation message having a supportedBandCombination IE set. In embodiments, the UECapabilityInformation message may contain the set of unlicensed frequency bands and LTE licensed band(s) associated with enablement of CA between CCs on licensed and unlicensed bands. The UECapabilityInformation message may further include one or more subfields associated with enablement of CA between CCs on licensed and unlicensed bands, such as support bandwidth class and/or the corresponding MIMO capability for downlink. While the UECapabilityInformation message may include information associated with one or more unlicensed bands, the UECapabilityInformation message may be received in a licensed band.

Similar to a signaling principle for LTE UE band combination(s), unlicensed frequency bands used by LTE-U may be labeled with one or more multiple frequency band roman numerals associated with a corresponding frequency allocation. In one embodiment, an unlicensed band in the 5170-5330 MHz (e.g., IEEE 8.0211x) may be numbered "X" and an unlicensed band in the 5490 and greater may be associated with UE LTE-U CA capability reporting. In such an embodiment, LTE-U operation on one or more unlicensed bands may include time division duplex (TDD) frame structure, including potential full downlink configuration (e.g., frequency division duplex (FDD) downlink only CC). Table 1 illustrates such an embodiment.

In another embodiment, the configuration circuitry 706 may process at least one message that is to indicate the capability of the UE to communicate through one or more unlicensed frequency bands based on an indication, included in the at least one message, of the UE's bandwidth classes for both licensed and unlicensed frequency bands and corresponding downlink MIMO capability—e.g., the at least one message may include a value "CA_1A-XC" that may indicate to the configuration circuitry 706 that the UE is capable of inter-band CA communication having a bandwidth class "A" on licensed frequency band 1 aggregated with bandwidth class "C" on unlicensed frequency band X.

In some embodiments, the configuration circuitry 706 may detect an indication, in the at least one message, for measurement gaps when operating on a licensed band and performing one or more measurements on the unlicensed frequency band. The configuration circuitry 706 may detect such an indication in an interFreqNeedForGaps IE of a UECapabilityInformation message. In response, the configuration circuitry 706 may identify one or more measurement gaps during which the UE may perform measurements. The configuration circuitry 706 may signal this information to the message generation circuitry 710 for transmission to the UE.

In support of communication in one or more unlicensed frequency bands, the configuration circuitry 706 may identify information associated with measurements to be performed by the UE on the one or more unlicensed frequency bands so that the eNB 700 may facilitate CA communication through one or more CCs in at least one unlicensed band. In embodiments, the configuration circuitry 706 may identify one or more measurements to be performed on one or more unlicensed bands, such as those unlicensed bands indicated to the configuration circuitry 706 in the capability message transmitted by the UE.

The configuration circuitry 706 may signal this identified information to the message generation circuitry 710. The message generation circuitry 710 may generate at least one message that is to indicate one or more measurements to be performed on one or more unlicensed bands by the UE. In one embodiment, this at least one message may comprise an RRC connection reconfiguration message. The RRC connection reconfiguration message may be transmitted to the UE via a licensed frequency band when the UE is operating in an RRC_Connected mode. In various embodiments, this message may trigger COS and/or CSI reporting by the UE and/or may define at least one event and/or period that is to trigger COS and/or CSI reporting by the UE.

In various embodiments, the message may include one or more of a measurement ID, a measurement type, a command (e.g., setup, modify, release), a measurement object, a measurement quantity, a reporting quantity, and a reporting criteria (e.g., periodic or aperiodic/event-triggered). In one embodiment, this message or another message may include an indication of one or more measurement gaps during which the UE is to perform one or more of the measurements. A measurement gap may be, for example, a time period during which no uplink transmissions are scheduled from the UE and the eNB 700. In response, the UE may perform the one or more measurements on the one or more unlicensed bands and compute one or more values based on the performed measurements. The UE may signal the one or more values to the eNB 700. Based on the one or more values, the configuration circuitry 706 may configure communication with the UE through one or more CCs in at least one unlicensed band.

According to various embodiments, the configuration circuitry 706 may be configured to indicate a request for CSI and/or COS reporting. The request for CSI reporting may include a request for one or more values associated with a CQI, a PMI, a PTI, and/or an RI. The request for COS reporting may include a request for an indication of busy and/or idle (e.g., a Boolean value or binary value) and/or a value from which the eNB may determine channel status.

In one embodiment, the configuration circuitry 706 may detect a value in COS reporting for RSSI for one or more CCs of an unlicensed band. From the RSSI value, the configuration circuitry 706 may determine if a measured frequency band is occupied, for example, by WiFi or LTE.

In another embodiment, the configuration circuitry 706 may detect a value in COS reporting for RSRP. From the RSRP value, the configuration circuitry 706 may determine whether the measured frequency band is occupied by LTE.

In another embodiment, the configuration circuitry 706 may detect a value in COS reporting for RSRQ. From the RSRQ, the configuration circuitry 706 may determine whether the measured frequency band is occupied by LTE.

In one embodiment, the configuration circuitry 706 may cause transmission, to the UE, of at least one of a CRS, a CSI-RS, and/or an LTE-U-specific reference signal (e.g., a reference signal transmitted every several milliseconds (ms), such as every 5 ms, 10 ms, or 40 ms) for computation of one or more values (e.g., RSRP, RSRQ) by the UE.

In another embodiment, the configuration circuitry 706 may detect a value in COS reporting that indicates whether an unlicensed frequency is busy or idle. This value may be a binary or Boolean value. The configuration circuitry 706 may detect indications of busy or idle for a plurality of CCs of an unlicensed band.

In another embodiment, the configuration circuitry 706 may detect a value in COS reporting that indicates one or more frequency bands suitable for CA—e.g., the "best" unlicensed bands and/or the bands with the least potential interference as measured by the UE. For example, the configuration circuitry 706 may process an indication from the UE of a plurality of CCs in an unlicensed band through which the UE may communicate.

In another embodiment, the configuration circuitry 706 may be configured to detect, for COS reporting, a value for a time period associated with comparison of detected interference and/or thermal noise to an LBT threshold. The configuration circuitry 706 may cause the message generation circuitry 710 to signal the LBT threshold to the UE. Based on the LBT threshold, the UE may report a first value for a time period in which a total received power, including all interference and/or thermal noise, is equal to or larger than the LBT threshold, and/or a second value may be a time period in which a total received power, including all interference and/or thermal noise, is less than the LBT threshold. The first and second values may be associated with one or more CCs of an unlicensed band and the configuration circuitry 706 may determine whether the one or more CCs are to be configured for communication with the UE based on the first and/or second values. Accordingly, the configuration circuitry 706 may determine idle and/or busy periods associated with the unlicensed band (e.g., when a measured band is occupied by WiFi and/or other LTE).

In one embodiment, the configuration circuitry 706 may configure and activate one or more CCs in an unlicensed band for communication with the UE without relying on CSI and/or COS reporting from the UE. In such embodiments, a PCell (e.g., a cell provided by the eNB 700) may be collocated with an SCell (e.g., a cell in an unlicensed band provided by an access node), although the eNB 700 may serve CCs on both licensed and unlicensed bands.

In various embodiments, the configuration circuitry 706 may process one or more messages received from the UE either periodically or aperiodically. The configuration circuitry 706 may cause the message generation circuitry 710 to generate a message that is to indicate whether COS and/or CSI reporting is to be periodic or aperiodic. In one embodiment, the message generation circuitry 706 may include such an indication in an RRC connection reconfiguration message; however, other embodiments are contemplated herein.

For aperiodic measurement reporting, downlink control information (DCI) formats 0 and 4 may be used for scheduling uplink transmission. For these two DCI formats, the configuration circuitry 706 may cause the message generation circuitry 710 to generate a message including a CSI request field. In particular, the configuration circuitry 706 may explicitly request, from the UE, an aperiodic channel state report to be transmitted on a PUSCH by setting one or more bits in an uplink grant. For CA, two bits may be used to indicate for which downlink CCs CSI should be reported. The number of bits (e.g., two bits) for a CSI request field may be redefined and/or extended, for example, for DCI formats 0 and 4 mapped onto USS. Zero-padding bits may be appended to CSI format 0 mapped onto USS to facilitate a same payload size of DCI format 0 and 1A. In one embodiment, the configuration circuitry 706 may request aperiodic COS reporting from the UE by causing the message generation circuitry 710 to generate a message having a CSI request field according to Table 2.

In another embodiment of aperiodic measurement reporting, the configuration circuitry 706 may request COS reporting from the UE based on an additional field associated with a DCI format. In such an embodiment, a DCI format may include a further field (e.g., a two-bit field). The message generation circuitry 710 may generate a DCI format on the USS having this further field. The configuration circuitry 706 may detect COS reporting together with CSI reporting from the UE through the corresponding PUSCH. According to one example of such an embodiment, the configuration circuitry 706 may cause the message generation circuitry 710 to transmit, to the UE, an indication of a combination of CCs for which COS reporting is to be performed.

In another embodiment of aperiodic measurement reporting, the configuration circuitry 706 may request COS reporting from the UE based on an additional field associated with a CSI request field. In such an embodiment, a CSI request may include additional bits (e.g., two or four additional bits) associated with a request for COS reporting.

For example, the configuration circuitry 706 may identify or configure a combination of serving cells on an unlicensed band and serving cells on a licensed band for COS and CSI reporting. The configuration circuitry 706 may then cause the message generation circuitry 710 to signal the combination of serving cells to the UE to trigger COS and/or CSI reporting therefrom.

The configuration circuitry 706 may cause the message generation circuitry 710 to generate a message having a CSI request field with additional bits that indicate to the UE that the UE is to perform RSSI measurements on one or more CCs—e.g., "0000" may indicate to the UE that the UE is to perform RSSI measurement for a CC associated with an index 5 on an unlicensed band and CCs associated with an index 3 on a licensed band, "0001" may indicate to the UE that the UE is to perform RSSI measurement for a CC associated with an index 1 on an unlicensed band together with CSI reporting on CCs associated with indexes 1 and 2 on a licensed band, etc.

In another example of such an embodiment, the configuration circuitry 706 may cause the message generation circuitry 710 to generate a message having a CSI request field with three bits to indicate to the UE that the UE is to perform RSSI measurements on one or more CCs. For example, the message generation circuitry 710 may generate a message having a value "000" in a CSI request field to indicate to the UE that the UE is to identify an unoccupied CC among configured CCs on an unlicensed band (e.g., a "best" unoccupied CC and/or an unoccupied CC having lower measured interference). Similarly, the message generation circuitry 710 may generate a message having a value "001" in a CSI request field to indicate to the UE that the UE is to identify two unoccupied CCs among configured CCs on an unlicensed band (e.g., two "best" unoccupied CCs and/or two unoccupied CCs having lowest measured interference). While the preceding two examples are illustrated in reference to a CSI request field having additional bits, similar examples are contemplated herein where the configuration circuitry 706 is to cause the message generation circuitry 710 to configure additional bits in a DCI format.

In another embodiment, the configuration circuitry 706 may be configured to activate and/or configure CCs on an unlicensed band without transmission of COS reporting, but rather based on aperiodic CSI reporting by the UE. For example, the configuration circuitry 706 may be configured to cause the message generation circuitry 710 to generate a request for CSI reporting to the UE. This request may include an indication of one or more CCs in the unlicensed band for which CSI reporting is to be performed. In response to this request, the configuration circuitry 706 may be configured to process CSI reporting, received from the UE, for these selected CCs in the unlicensed band. In such an embodiment, the configuration circuitry 706 may be configured to detect, in a response from the UE, one or more bits corresponding to each selected CC to indicate the serving cell(s) for which CSI reporting is included. The number of CCs to be selected may be predetermined (e.g., defined in a specification), or the configuration circuitry 706 may cause the message generation circuitry 710 to generate a message for transmission to the UE indicating the number of CCs.

For periodic measurement reporting, PUCCH format 2/2a/2b/3 may be used for transmission of CSI reporting on the PUCCH. In particular, CQI information may be coded using a (20, A) Reed-Muller code where transmitted with PUCCH format 2/2a/2b.

In various embodiments, the configuration circuitry 706 may detect COS reporting in association with PUCCH format 2. Depending on the number of bits associated with COS reporting, the configuration circuitry 706 may process a single PUCCH instance that includes multiple values for multiple serving cells and/or CCs of an unlicensed band to be aggregated. The baseband circuitry 712 may demultiplex the bits according to time-division multiplexing (TDM). In embodiments, the configuration circuitry 706 may configure dedicated resource allocation for LTE-U PUCCH format 2 transmission and may cause transmission of the same to the UE.

In one embodiment, the configuration circuitry 706 may request the message generation circuitry 710 to transmit, to the UE, a request for one or more unoccupied CCs among a plurality of CCs of an unlicensed band. For example, the configuration circuitry 706 may request the two best CCs among 8 CCs, and the number of bits associated with COS reporting may be 6. For periodic CSI and COS reporting for CCs on an unlicensed band, the configuration circuitry 706 may request reporting for different CCs with different offset values in the time domain. In the event that periodic CSI and COS reporting collide in a same subframe, different reports may be prioritized according to a predetermined prioritization list.

In another embodiment of periodic reporting, the configuration circuitry 706 may request COS reporting having a plurality of RSSI measurement values for a plurality of CCs (e.g., two) of an unlicensed band, and bits (e.g., eight) associated with a respective RSSI measurement value for a respective CC may be received on PUCCHs with a different offset in the time domain.

In another embodiment of periodic reporting, PUCCH format 2/2a/2b may be extended to support LTE-U measurement reporting. In particular, the baseband circuitry 712 is to demultiplex bits associated with COS reporting and bits associated with CQI and/or RI after channel decoding in the baseband circuitry 712. This extension of the PUCCH format 2/2a/2b may be appropriate when the total number of bits associated with COS reporting is relatively small.

In another embodiment of periodic reporting, PUCCH format 3 may be reused to support LTE-U measurement reporting. Given that forty-eight encoded bits may be received in one PUCCH format 3, bits associated with multiple measurement values for COS reporting may be aggregated, jointly or separately encoded by the UE, and transmitted on a single PUCCH instance. The configuration circuitry 710 may be configured to decode the bits received on the PUCCH instance according to whether the bits are jointly or separately encoded at the UE. In one embodiment, the configuration circuitry 706 may be configured to identify a PUCCH resource associated with such bits and, through the message generation circuitry 710, transmit an indication of the PUCCH resource to the UE (e.g., via RRC signaling).

Figure 8:
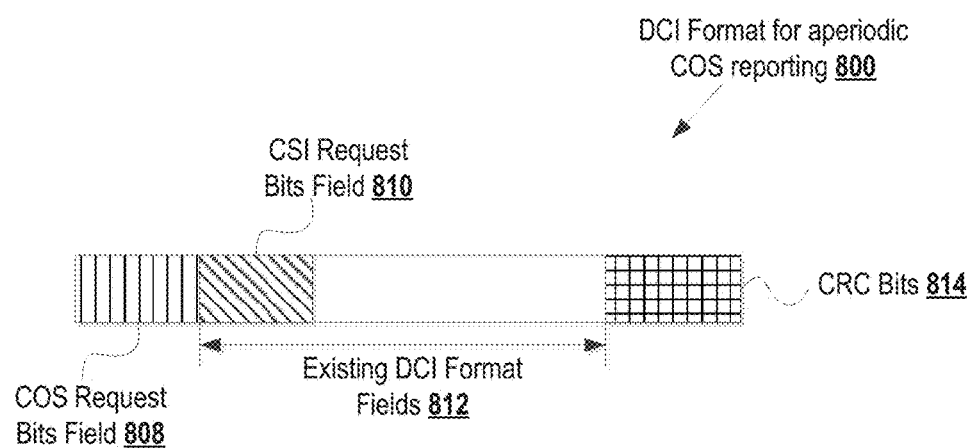
FIG. 8 is a block diagram illustrating a Downlink Control Information format for aperiodic channel occupancy status reporting, in accordance with various embodiments.

In reference to FIG. 8, a block diagram illustrates a DCI format for aperiodic COS reporting. In various embodiments, this DCI format 800 may be used to signal a UE that the UE is to provide an eNB with aperiodic COS reporting. For example, the DCI format 800 may be communicated by the eNB 105 to the UE 130 on a primary carrier 153 in a licensed spectrum 152, as illustrated in FIG. 1.

In various embodiments, a DCI format 800 may include existing DCI format fields 812. The existing DCI format fields 812 may comprise a field 810 associated with bits for a CSI request. Further, the DCI format may include a field 814 associated with bits for a cyclic redundancy check (CRC).

In embodiments, the DCI format 800 may be extended by inclusion of one or more bits 808 associated with a COS request field. The COS request bits of the field 808 may comprise a plurality of bits (e.g., two) indicating how aperiodic reporting is to be triggered. For example, the field 808 may include bits according to Table 1 to indicate how aperiodic COS reporting is to be triggered at the UE.

Figure 9:
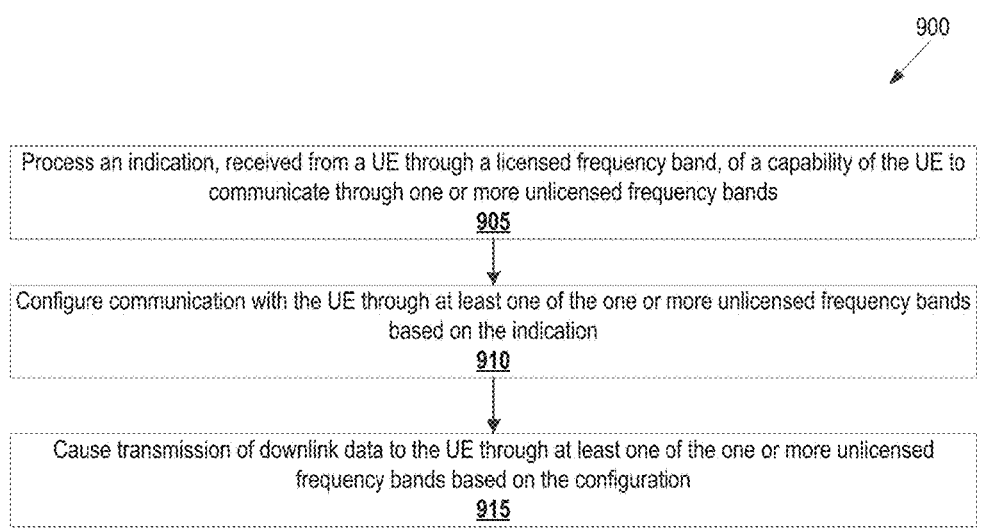
FIG. 9 is a flow diagram illustrating a method for configuring communication with a user equipment through an unlicensed frequency band, in accordance with various embodiments.

With respect to FIG. 9, a flow diagram illustrates a method 900 for configuring communication with a UE through an unlicensed frequency band, in accordance with various embodiments. The method 900 may be performed by an eNB, such as the eNB 105 of FIG. 1. While FIG. 9 illustrates a plurality of sequential operations, one of ordinary skill would understand that one or more operations of the method 900 may be transposed and/or performed contemporaneously.

To begin, the method 900 may include an operation 905 for processing an indication, received from a UE through a licensed frequency band, of a capability of the UE to communicate through one or more unlicensed frequency bands. In one embodiment, operation 905 may comprise operations associated with transmitting a request for at least one measurement report to the UE and receiving the at least one measurement report from the UE based on the request. In one embodiment, the request may comprise an indication that the measurement report should be either periodic or aperiodic.

At operation 910, the method 900 may comprise configuring communication with the UE through at least one of the one or more unlicensed frequency bands based on the indication. In one embodiment of operation 910, communication with the UE may be configured based on the at least one measurement report. In another embodiment of operation 910, communication with the UE through the one or more unlicensed frequency bands may be configured without reliance on an Radio Resource Management (RRM) report received from the UE.

Subsequently, operation 915 may comprise causing transmission of downlink data to the UE through at least one of the one or more unlicensed frequency bands based on the configuration.

Figure 10:
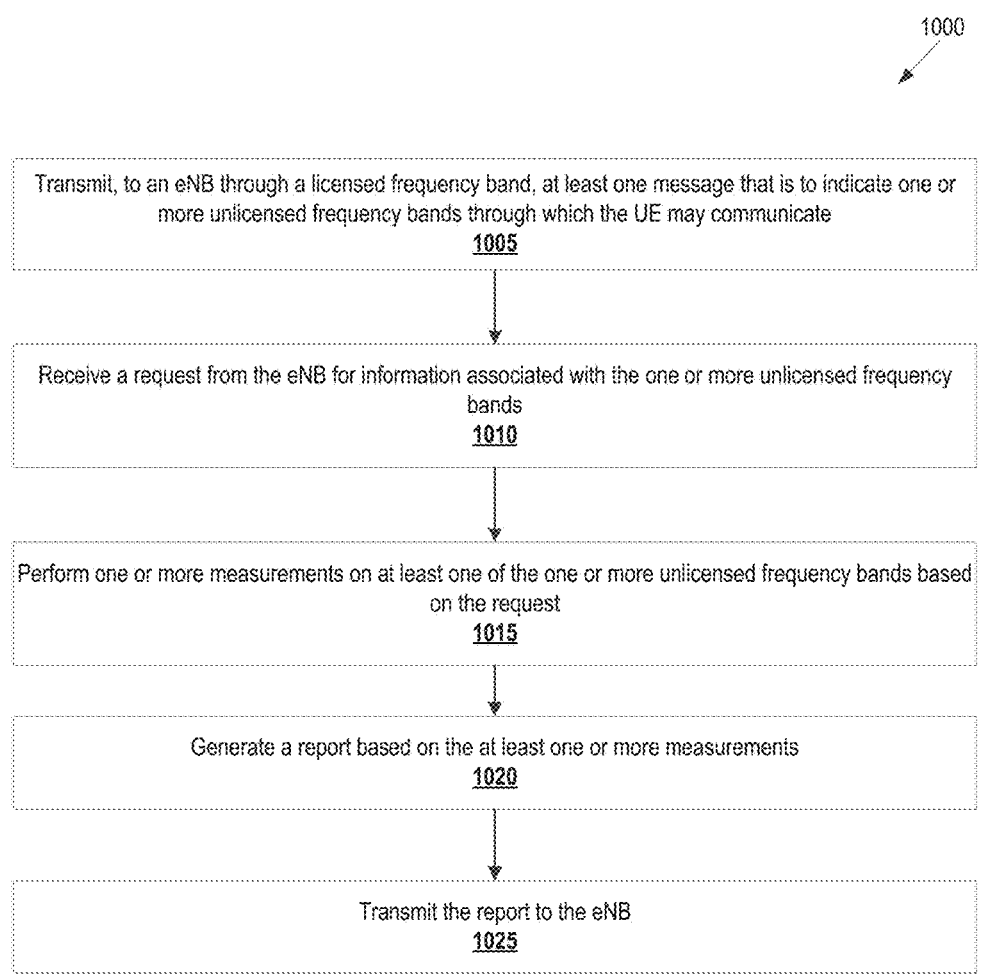
FIG. 10 is a flow diagram illustrating a method for facilitating communication with a user equipment in an unlicensed band, in accordance with various embodiments.

With respect to FIG. 10, a flow diagram illustrates a method 1000 for facilitating communication with a UE in an unlicensed band, in accordance with various embodiments. The method 1000 may be performed by a UE, such as the UE 130 of FIG. 1. While FIG. 10 illustrates a plurality of sequential operations, one of ordinary skill would understand that one or more operations of the method 1000 may be transposed and/or performed contemporaneously.

To begin, the method 1000 may include an operation 1005 for transmitting, to an eNB through a licensed frequency band, at least one message that is to indicate one or more unlicensed frequency bands through which the UE may communicate. Operation 1010 may comprise receiving a request from the eNB for information associated with the one or more unlicensed frequency bands. In various embodiments, this request may comprise an indication of one or more measurements to be performed on the one or more unlicensed frequency bands and/or an indication of whether measurement reporting should be periodic or aperiodic.

At operation 1015, the method 1000 may comprise performing one or more measurements on at least one of the one or more unlicensed frequency bands based on the request. Thereafter, operation 1020 may comprise generating a report based on the at least one or more performed measurements. At operation 1025, the method 1000 may comprise transmitting the report to the eNB. In various embodiments, the eNB may then activate and configure the one or more unlicensed frequency bands for communication with the UE.

Figure 11:
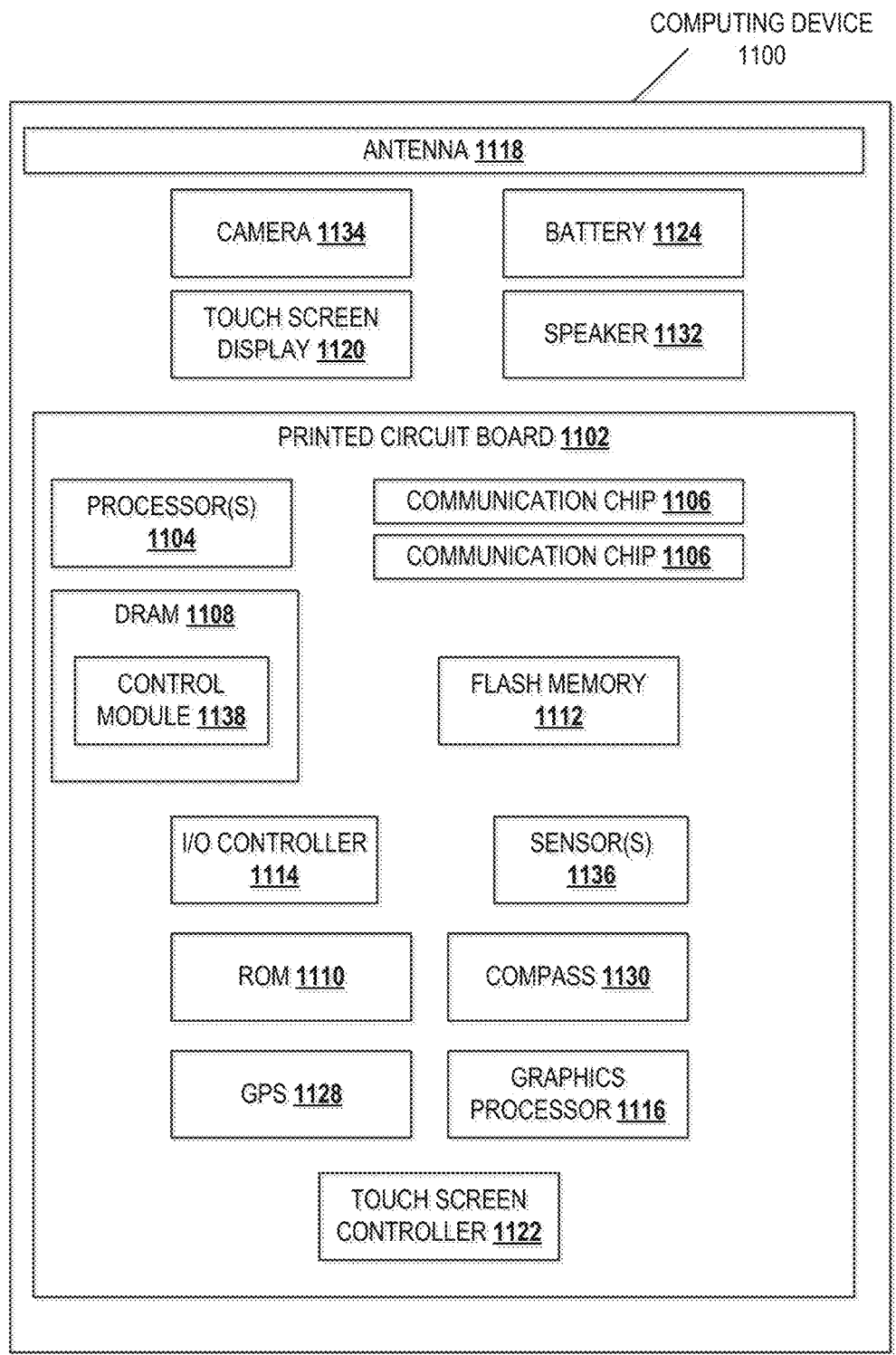
FIG. 11 is a block diagram illustrating a computing device adapted to operate in a wireless communication network, in accordance with various embodiments.

Now with reference to FIG. 11, a block diagram illustrates an example computing device 1100, in accordance with various embodiments. An eNB 105, 700 or a UE 130, 200 of FIGS. 1, 2, and/or 7 and described herein may be implemented on a computing device such as computing device 1100. Further, the computing device 1100 may be adapted to perform one or more operations of the methods 900-1000 described in FIGS. 9-10, respectively. The computing device 1100 may include a number of components, one or more processors 1104, and one or more communication chips 1106. Depending upon the embodiment, one or more of the enumerated components may comprise "circuitry" of the computing device 1100, such as processing circuitry, communications circuitry, and the like. In various embodiments, the one or more processor(s) 1104 each may be a processor core. In various embodiments, the one or more communication chips 1106 may be physically and electrically coupled with the one or more processor(s) 1104. In further implementations, the communication chips 1106 may be part of the one or more processor(s) 1104. In various embodiments, the computing device 1100 may include a printed circuit board (PCB) 1102. For these embodiments, the one or more processor(s) 1104 and communication chip 1106 may be disposed thereon. In alternate embodiments, the various components may be coupled without the employment of the PCB 1102.

Depending upon its applications, the computing device 1100 may include other components that may or may not be physically and electrically coupled with the PCB 1102. These other components include, but are not limited to, volatile memory (e.g., dynamic random access memory 1108, also referred to as DRAM), non-volatile memory (e.g., read only memory 1110, also referred to as ROM), flash memory 1112, an input/output controller 1114, a digital signal processor (not shown), a crypto processor (not shown), a graphics processor 1116, one or more antenna(s) 1118, a display (not shown), a touch screen display 1120, a touch screen controller 1122, a battery 1124, an audio codec (not shown), a video code (not shown), a global navigation satellite system 1128, a compass 1130, an accelerometer (not shown), a gyroscope (not shown), a speaker 1132, a camera 1134, one or more sensors 1136 (e.g., a barometer, Geiger counter, thermometer, viscometer, rheometer, altimeter, or other sensor that may be found in various manufacturing environments or used in other applications), a mass storage device (e.g., a hard disk drive, a solid state drive, compact disk and drive, digital versatile disk and drive, etc.) (not shown), and the like. In various embodiments, the one or more processor(s) 1104 may be integrated on the same die with other components to form a system on a chip (SOC).

In various embodiments, volatile memory (e.g., DRAM 1108), non-volatile memory (e.g., ROM 1110), flash memory 1112, and the mass storage device (not shown) may include programming instructions configured to enable the computing device 1100, in response to the execution by one or more processor(s) 1104, to practice all or selected aspects of the data exchanges and methods described herein, depending on the embodiment of the computing device 1100 used to implement such data exchanges and methods. More specifically, one or more of the memory components (e.g., DRAM 1108, ROM 1110, flash memory 1112, and the mass storage device) may include temporal and/or persistent copies of instructions that, when executed by one or more processor(s) 1104, enable the computing device 1100 to operate one or more modules 1138 configured to practice all or selected aspects of the data exchanges and method described herein, depending on the embodiment of the computing device 1100 used to implement such data exchanges and methods.

The communication chips 1106 may enable wired and/or wireless communication for the transfer of data to and from the computing device 1100. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 1106 may implement any of a number of wireless standards or protocols, including but not limited to LTE, LTE-A, Institute of Electrical and Electronics Engineers (IEEE) 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data Rates for GSM Evolution (EDGE), Code Division Multiple Access (CDMA), Time Division Multiple Access (TDMA), Digital Enhanced Cordless Telecommunications (DECT), Bluetooth, derivatives thereof, as well as other wireless protocols that are designated as 3G, 4G, 5G, and beyond. The computing device 1100 may include a plurality of communication chips 1106 adapted to perform different communication functions. For example, a first communication chip 1106 may be dedicated to shorter range wireless communications, such as Wi-Fi and Bluetooth, whereas a second communication chip 1106 may be dedicated to longer range wireless communications, such as GPS, EDGE, GPRS, CDMA, WiMAX, LTE, LTE-A, Ev-DO, and the like.

Example 1 may be an evolved Node B (eNB) comprising: configuration circuitry to: process an indication of a capability of a user equipment (UE) to communicate through one or more unlicensed frequency bands according to a Long Term Evolution (LTE) standard; identify information associated with measurement reporting based on the indication of the capability of the UE; process a measurement report, received from the UE, associated with the one or more unlicensed frequency bands; and configure communication with the UE through at least one of the one or more unlicensed frequency bands based on the measurement report; and message generation circuitry, coupled with the measurement configuration circuitry, to generate at least one message based on the information associated with the measurement reporting and cause transmission of the at least one message to the UE for measurement reporting associated with the one or more unlicensed frequency bands by the UE. Example 2 may include the eNB of example 1, wherein to cause transmission of the at least one message comprises to cause transmission of at least one radio resource control (RRC) connection reconfiguration message to the UE, wherein the UE is to operate in an RRC_Connected mode. Example 3 may include the eNB of example 1, wherein to generate the at least one message comprises to generate the at least one message to include, in association with one or more measurements to be performed by the UE, one or more of an identifier, a type, a command, one or more measurement objects, a measurement quantity, and/or a reporting criteria. Example 4 may include the eNB of example 3, wherein to generate the at least one message comprises to generate the at least one message to indicate that the measurement quantity is to comprise, in association with the one or more unlicensed frequency bands, at least one value that is based on at least one of a Received Signal Strength Indicator (RSSI), a Reference Signal Received Power (RSRP), a Reference Signal Received Quality (RSRQ), and/or an indication of busy or idle status. Example 5 may include the eNB of example 1, wherein to generate the at least one message comprises to generate the at least one message to include, in association with one or more measurements to be performed by the UE, a request for at least one channel occupancy status (COS) for at least one of the one or more unlicensed frequency bands. Example 6 may include the eNB of any of examples 1-5, wherein to generate the at least one message comprises to generate the at least one message to include an indication that the measurement reporting from the UE is to be aperiodic. Example 7 may include the eNB of example 6, wherein the indication comprises one or more bits associated with a channel-state information (CSI) request field. Example 8 may include the eNB of example 6, wherein to cause transmission of the at least one message to the UE comprises to cause transmission of the indication on UE-specific search space (USS). Example 9 may include the eNB of any of examples 1-5, wherein to generate the at least one message comprises to generate the at least one message to include an indication that the measurement reporting from the UE is to be periodic.

Example 10 may be a user equipment (UE) comprising: control circuitry to: generate at least one message that is to indicate one or more unlicensed frequency bands through which the UE may communicate according to a Long Term Evolution (LTE) standard; cause transmission of the at least one message to an evolved Node B (eNB); process an indication, received from the eNB based on the at least one message, of one or more measurements to be performed by the UE; generate at least one other message that is to include one or more values based on one or more measurements performed by the UE; and cause, based on the indication, transmission of the at least one other message to the eNB; and measurement circuitry to perform the one or more measurements on at least one of the one or more unlicensed frequency bands based on the indication received from the eNB and compute the one or more values based on the one or more performed measurements. Example 11 may include the UE of example 10, wherein the indication is to include, in association with the one or more measurements, one or more of an identifier, a type, a command, one or more measurement objects, a measurement quantity, and/or a reporting criteria. Example 12 may include the UE of example 10, wherein to perform the one or more measurements on at least one of the one or more unlicensed frequency bands comprises to measure at least one of a Received Signal Strength Indicator (RSSI), a Reference Signal Received Power (RSRP), and/or a Reference Signal Received Quality (RSRQ). Example 13 may include the UE of example 10, wherein to perform the one or more measurements on at least one of the one or more unlicensed frequency bands comprises to detect if one or more unlicensed frequency bands are busy or idle. Example 14 may include the UE of example 13, wherein to generate at least one other message comprises to generate the message to include an indication of the detection for a first unlicensed frequency band and at least one other value for at least one other measurement performed on the first unlicensed frequency band. Example 15 may include the UE of any of examples 10-14, wherein to cause transmission of the at least one other message to the eNB comprises to cause aperiodic transmission of the at least one other message based on an indication received from the eNB. Example 16 may include the UE of example 15, wherein the indication comprises one or more bits associated with a channel-state information (CSI) request field. Example 17 may include the UE of example 15, wherein the control circuitry is to detect the indication on UE-specific search space (USS). Example 18 may include the UE of any of examples 10-14, wherein to cause transmission of the at least one other message to the eNB comprises to cause periodic transmission of the at least one other message based on an indication received from the eNB.

Example 19 may be one or more non-transitory computer-readable media comprising computing device-executable instructions, wherein the instructions, in response to execution by an evolved Node B (eNB), cause the eNB to: process an indication, received from a user equipment (UE) through a licensed frequency band, of a capability of the UE to communicate through one or more unlicensed frequency bands; configure communication with the UE through at least one of the one or more unlicensed frequency bands based on the indication; and cause transmission of downlink data to the UE through at least one of the one or more unlicensed frequency bands based on the configuration. Example 20 may include the one or more non-transitory computer-readable media of example 19, wherein the to configure communication with the UE comprises to configure communication with the UE through at least one of the one or more unlicensed frequency bands without reliance on a Radio Resource Management (RRM) report from the UE. Example 21 may include the one or more non-transitory computer-readable media of any of examples 19-20, wherein to configure communication with the UE comprises to: transmit a request for at least one measurement report to the UE; receive at least the at least one measurement report from the UE; and configure communication with the UE through at least one of the one or more unlicensed frequency bands further based on the at least one measurement report. Example 22 may include the one or more non-transitory computer-readable media of example 21, wherein the request further comprises an indication that the measurement report should be either periodic or aperiodic.

Example 23 may be one or more non-transitory computer-readable media comprising computing device-executable instructions, wherein the instructions, in response to execution by a user equipment (UE), cause the UE to: transmit, to an evolved Node B (eNB) through a licensed frequency band, at least one message that is to indicate one or more unlicensed frequency bands through which the UE may communicate; receive a request from the eNB for information associated with the one or more unlicensed frequency bands; perform one or more measurements on at least one of the one or more unlicensed frequency bands based on the request; generate a report based on the at least one or more measurements; and transmit the report to the eNB. Example 24 may include the one or more non-transitory computer-readable media of example 23, wherein the request further comprises an indication that the report should be either periodic or aperiodic and wherein the instructions are to cause transmission of the report to the eNB either periodically or aperiodically based on the indication. Example 25 may include the one or more non-transitory computer-readable media of any of examples 23-24, wherein to perform the one or more measurements on at least one of the one or more unlicensed frequency bands comprises to measure at least one of a Received Signal Strength Indicator (RSSI), a Reference Signal Received Power (RSRP), and/or a Reference Signal Received Quality (RSRQ) or to detect a busy or idle status for at least one of the one or more unlicensed frequency bands.

Example 26 may be a method to be performed in an evolved Node B (eNB), the method comprising: receiving an indication, from a user equipment (UE) through a licensed frequency band, of a capability of the UE to communicate through one or more unlicensed frequency bands; configuring communication with the UE through at least one of the one or more unlicensed frequency bands based on the indication; and transmitting downlink data to the UE through at least one of the one or more unlicensed frequency bands based on the configuration. Example 27 may include the method of example 26, wherein the configuring communication with the UE comprises configuring communication with the UE through at least one of the one or more unlicensed frequency bands without reliance on a Radio Resource Management (RRM) report from the UE. Example 28 may include the method of any of examples 26-27, wherein configuring communication with the UE comprises: transmitting a request for at least one measurement report to the UE; receiving at least the at least one measurement report from the UE; and configuring communication with the UE through at least one of the one or more unlicensed frequency bands further based on the at least one measurement report. Example 29 may include the method of example 28, wherein the request further comprises an indication that the measurement report should be either periodic or aperiodic.

Example 30 may be a method to be performed in a user equipment (UE), the method comprising: transmitting, to an evolved Node B (eNB) through a licensed frequency band, at least one message that is to indicate one or more unlicensed frequency bands through which the UE may communicate; receiving a request from the eNB for information associated with the one or more unlicensed frequency bands; performing one or more measurements on at least one of the one or more unlicensed frequency bands based on the request; generating a report based on the at least one or more measurements; and transmitting the report to the eNB. Example 31 may include the method of example 30, wherein the request further comprises an indication that the report should be either periodic or aperiodic and wherein the transmitting of the report to the eNB is either periodic or aperiodic based on the indication. Example 32 may include the method of any of examples 30-31, wherein the performing of the one or more measurements on at least one of the one or more unlicensed frequency bands comprises measuring at least one of a Received Signal Strength Indicator (RSSI), a Reference Signal Received Power (RSRP), and/or a Reference Signal Received Quality (RSRQ) or detecting a busy or idle status for at least one of the one or more unlicensed frequency bands.

Example 33 may be an apparatus comprising: means for receiving an indication, from a user equipment (UE) through a licensed frequency band, of a capability of the UE to communicate through one or more unlicensed frequency bands; means for configuring communication with the UE through at least one of the one or more unlicensed frequency bands based on the indication; and means for transmitting downlink data to the UE through at least one of the one or more unlicensed frequency bands based on the configuration. Example 34 may include the apparatus of example 33, wherein the means for configuring communication with the UE comprises means for configuring communication with the UE through at least one of the one or more unlicensed frequency bands without reliance on a Radio Resource Management (RRM) report from the UE. Example 35 may include the apparatus of any of examples 33-34, wherein the means for configuring communication with the UE comprises: means for transmitting a request for at least one measurement report to the UE; means for receiving at least the at least one measurement report from the UE; and means for configuring communication with the UE through at least one of the one or more unlicensed frequency bands further based on the at least one measurement report. Example 36 may include the apparatus of example 35, wherein the request further comprises an indication that the measurement report should be either periodic or aperiodic.

Example 37 may be an apparatus comprising: means for transmitting, to an evolved Node B (eNB) through a licensed frequency band, at least one message that is to indicate one or more unlicensed frequency bands through which the UE may communicate; means for receiving a request from the eNB for information associated with the one or more unlicensed frequency bands; means for performing one or more measurements on at least one of the one or more unlicensed frequency bands based on the request; means for generating a report based on the at least one or more measurements; and means for transmitting the report to the eNB. Example 38 may include the apparatus of example 37, wherein the request further comprises an indication that the report should be either periodic or aperiodic and wherein the transmitting of the report to the eNB is either periodic or aperiodic based on the indication. Example 39 may include the apparatus of any of examples 37-38, wherein the means for performing of the one or more measurements on at least one of the one or more unlicensed frequency bands comprises means for measuring at least one of a Received Signal Strength Indicator (RSSI), a Reference Signal Received Power (RSRP), and/or a Reference Signal Received Quality (RSRQ) or means for detecting a busy or idle status for at least one of the one or more unlicensed frequency bands.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine—(e.g., a computer-) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An evolved Node B (eNB) comprising:
configuration circuitry to:
process first and second information elements (IEs) received from a user equipment (UE), the first IE to indicate a set of licensed and unlicensed frequency bands that the UE is capable of using to communicate with access nodes of a radio access network using inter-band carrier aggregation and the second IE to indicate a need for measurement gaps in communications on the licensed frequency band to facilitate measurements on the unlicensed frequency band;
identify information associated with measurement reporting based on the first IE;
process a measurement report, received from the UE, associated with the unlicensed frequency band; and
configure communication with the UE through the unlicensed frequency band based on the measurement report; and
message generation circuitry, coupled with the configuration circuitry, to generate at least one message to include the information associated with the measurement report and cause transmission of the at least one message to the UE for measurement reporting associated with the unlicensed frequency band by the UE, wherein the measurement report, received from the UE, is based on the information associated with measurement reporting.

2. The eNB of claim 1, wherein to cause transmission of the at least one message comprises to cause transmission of at least one radio resource control (RRC) connection reconfiguration message to the UE, wherein the UE is to operate in an RRC_Connected mode.

3. The eNB of claim 1, wherein to generate the at least one message comprises to generate the at least one message to include, in association with one or more measurements to be performed by the UE, one or more of an identifier, a type, a command, one or more measurement objects, a measurement quantity, and/or a reporting criteria.

4. The eNB of claim 3, wherein to generate the at least one message comprises to generate the at least one message to indicate that the measurement quantity is to comprise, in association with the unlicensed frequency band, at least one value that is based on at least one of a Received Signal Strength Indicator (RSSI), a Reference Signal Received Power (RSRP), a Reference Signal Received Quality (RSRQ), and/or an indication of busy or idle status.

5. The eNB of claim 1, wherein to generate the at least one message comprises to generate the at least one message to include, in association with one or more measurements to be performed by the UE, a request for at least one channel occupancy status (COS) for the unlicensed frequency band.

6. The eNB of claim 1, wherein to generate the at least one message comprises to generate the at least one message to include an indication that the measurement reporting from the UE is to be aperiodic.

7. The eNB of claim 6, wherein the indication comprises one or more bits associated with a channel-state information (CSI) request field.

8. The eNB of claim 6, wherein to cause transmission of the at least one message to the UE comprises to cause transmission of the indication on UE-specific search space (USS).

9. The eNB of claim 1, wherein to generate the at least one message comprises to generate the at least one message to include an indication that the measurement reporting from the UE is to be periodic.

10. A user equipment (UE) comprising:
control circuitry to:
generate at least one message that includes first and second information elements (IEs), the first IE to indicate a set of licensed and unlicensed frequency bands that the UE is capable of using to communicate with access nodes of a radio access network using inter-band carrier aggregation and the second IE to indicate a need for measurement gaps in communications on the licensed frequency band to facilitate measurements on the unlicensed frequency band;
cause transmission of the at least one message to an evolved Node B (eNB);
process a second indication, received from the eNB based on the at least one message, of one or more measurements to be performed by the UE;
generate at least one other message that is to include one or more values based on one or more measurements performed by the UE; and
cause, based on the indication, transmission of the at least one other message to the eNB; and
measurement circuitry to perform the one or more measurements on at least the unlicensed frequency band based on the indication received from the eNB and compute the one or more values based on the one or more performed measurements.

11. The UE of claim 10, wherein the second indication is to include, in association with the one or more measurements, one or more of an identifier, a type, a command, one or more measurement objects, a measurement quantity, and/or a reporting criteria.

12. The UE of claim 10, wherein to perform the one or more measurements on at least the unlicensed frequency band comprises to measure at least one of a Received Signal Strength Indicator (RSSI), a Reference Signal Received Power (RSRP), and/or a Reference Signal Received Quality (RSRQ).

13. The UE of claim 10, wherein to perform the one or more measurements on at least the unlicensed frequency band comprises to detect if the unlicensed frequency band is busy or idle.

14. The UE of claim 13, wherein to generate at least one other message comprises to generate the at least one other message to include a third indication of the detection for the unlicensed frequency band and at least one other value for at least one other measurement performed on the unlicensed frequency band.

15. The UE of claim 10, wherein to cause transmission of the at least one other message to the eNB comprises to cause aperiodic transmission of the at least one other message based on an indication received from the eNB.

16. The UE of claim 15, wherein the indication comprises one or more bits associated with a channel-state information (CSI) request field.

17. The UE of claim 15, wherein the control circuitry is to detect the indication on UE-specific search space (USS).

18. The UE of claim 10, wherein to cause transmission of the at least one other message to the eNB comprises to cause periodic transmission of the at least one other message based on an indication received from the eNB.

19. One or more non-transitory computer-readable media comprising computing device-executable instructions, wherein the instructions, in response to execution by an evolved Node B (eNB), cause the eNB to:
process first and second information elements (IEs) received from a user equipment (UE) through a licensed frequency band, the first IE to indicate a set of licensed and unlicensed frequency bands that the UE is capable of using to communicate with access nodes of a radio access network using inter-band carrier aggregation and the second IE to indicate a need for measurement gaps in communications on the licensed frequency band to facilitate measurements on the unlicensed frequency band;
configure communication with the UE through at least the licensed and unlicensed frequency bands based on the first IE; and
cause transmission of downlink data to the UE through at least the unlicensed frequency bands based on the configuration.

20. The one or more non-transitory computer-readable media of claim 19, wherein to configure communication with the UE comprises to configure communication with the UE through at least the licensed and unlicensed frequency bands without reliance on a Radio Resource Management (RRM) report from the UE.

21. The one or more non-transitory computer-readable media of claim 19, wherein to configure communication with the UE comprises to:
transmit a request for at least one measurement report to the UE;
receive at least the at least one measurement report from the UE; and
configure communication with the UE through at least the unlicensed frequency band further based on the at least one measurement report.

22. The one or more non-transitory computer-readable media of claim 21, wherein the request further comprises an indication that the measurement report should be either periodic or aperiodic.

23. One or more non-transitory computer-readable media comprising computing device-executable instructions, wherein the instructions, in response to execution by a user equipment (UE), cause the UE to:
transmit, to an evolved Node B (eNB) through a licensed frequency band, at least one message that includes first and second information elements (IEs), the first IE to indicate a set of licensed and unlicensed frequency bands that the UE is capable of using to communicate with access nodes of a radio access network using inter-band carrier aggregation and the second IE to indicate a need for measurement gaps in communications on the licensed frequency band to facilitate measurements on the unlicensed frequency band;
receive a request from the eNB for information associated with the unlicensed frequency band;
perform one or more measurements on the unlicensed frequency band based on the request;
generate a report based on the at least one or more measurements; and
transmit the report to the eNB.

24. The one or more non-transitory computer-readable media of claim 23, wherein the request further comprises an indication that the report should be either periodic or aperiodic and wherein the instructions are to cause transmission of the report to the eNB either periodically or aperiodically based on the indication.

25. The one or more non-transitory computer-readable media of claim 23, wherein to perform the one or more measurements on the unlicensed frequency band comprises to measure at least one of a Received Signal Strength Indicator (RSSI), a Reference Signal Received Power (RSRP), and/or a Reference Signal Received Quality (RSRQ) or to detect a busy or idle status for the unlicensed frequency band.

* * * * *